(12) United States Patent
Huber et al.

(10) Patent No.: US 8,567,853 B2
(45) Date of Patent: Oct. 29, 2013

(54) VEHICLE BODY STRUCTURE

(75) Inventors: Matthew Huber, Novi, MI (US); Hugo F Fortin, Commerce Township, MI (US)

(73) Assignee: Nissan North America, Inc., Franklin, TN (US)

(*) Notice: Subject to any disclaimer, the term of this patent is extended or adjusted under 35 U.S.C. 154(b) by 165 days.

(21) Appl. No.: 13/194,457

(22) Filed: Jul. 29, 2011

(65) Prior Publication Data

US 2013/0026791 A1    Jan. 31, 2013

(51) Int. Cl.
B62D 25/08    (2006.01)

(52) U.S. Cl.
USPC .............. 296/193.09; 296/203.01; 296/198; 293/120

(58) Field of Classification Search
USPC ............. 296/193.09, 193.1, 203.02, 187.09, 296/198; 293/120, 102
See application file for complete search history.

(56) References Cited

U.S. PATENT DOCUMENTS

| | | | |
|---|---|---|---|
| 5,029,920 A | 7/1991 | Furuta et al. | |
| 6,357,821 B1* | 3/2002 | Maj et al. | 296/193.09 |
| 6,386,624 B1* | 5/2002 | Schultz et al. | 296/193.1 |
| 6,945,593 B2* | 9/2005 | Andre et al. | 296/187.09 |
| 7,097,239 B2* | 8/2006 | Lazzeroni | 296/203.01 |
| 7,207,617 B2 | 4/2007 | Pelini | |
| 7,246,832 B2* | 7/2007 | Cobble et al. | 293/115 |
| 7,258,385 B2* | 8/2007 | Andre et al. | 296/64 |
| 7,347,489 B2* | 3/2008 | Ziaja et al. | 296/193.03 |
| 7,540,550 B1* | 6/2009 | Huber et al. | 296/29 |
| 7,571,957 B2* | 8/2009 | Povinelli et al. | 296/193.09 |
| 7,644,966 B2* | 1/2010 | Huber et al. | 293/155 |
| 7,735,226 B2* | 6/2010 | Riviere et al. | 29/897.2 |
| 7,841,651 B2* | 11/2010 | Crainic et al. | 296/193.09 |
| 7,850,226 B2* | 12/2010 | Hedderly | 296/193.05 |
| 7,887,125 B2* | 2/2011 | Tazaki et al. | 296/193.1 |
| 7,914,070 B2* | 3/2011 | Fayt | 296/193.09 |
| 8,087,721 B2* | 1/2012 | Kralevich et al. | 296/198 |
| 8,196,998 B2* | 6/2012 | Ohno et al. | 296/193.09 |
| 8,348,333 B2* | 1/2013 | Iammarino et al. | 296/187.09 |
| 2002/0117875 A1* | 8/2002 | Hoffner et al. | 296/194 |
| 2005/0275227 A1* | 12/2005 | Ahn | 293/155 |
| 2013/0026791 A1* | 1/2013 | Huber et al. | 296/193.09 |

* cited by examiner

*Primary Examiner* — Glenn Dayoan
*Assistant Examiner* — Gregory Blankenship
(74) *Attorney, Agent, or Firm* — Global IP Counselors, LLP

(57) ABSTRACT

A vehicle body structure includes a bumper fascia panel and a fascia support bracket. The bumper fascia panel includes side and front end fascia sections. The front end and side fascia sections are integrally formed as a one-piece member. The side fascia section includes upper and lower fascia portions defining a fascia cutout such that they at least partially surround a vehicle lamp area. The fascia support bracket includes front end and side fascia supports. The front end fascia support supports an inboard surface of the bumper fascia panel along the front end fascia section. The side fascia support includes upper and lower support portions that support the inboard surface of the bumper fascia panel along the upper and lower fascia portions, respectively. The upper and lower support portions define a support cutout such that they at least partially surround the vehicle lamp area.

20 Claims, 21 Drawing Sheets

VEHICLE BODY STRUCTURE

BACKGROUND

1. Field of the Invention

The present invention generally relates to a vehicle body structure. More specifically, the present invention relates to a vehicle body structure including a fascia support bracket that provides support for a bumper fascia panel so as to prevent sagging of the bumper fascia panel.

2. Background Information

For many years, automotive vehicles have been provided with front and rear bumpers to cushion the vehicle in the event of an impact. Also, for many years, automotive vehicles have been provided with numerous body and/or fascia panels coupled thereto to form the outer shell of the vehicle body. In recent years, it has been desirable to make vehicles with a smooth exterior shape, in which the bumpers are integrated with the overall shape of the vehicle body. Thus, in recent years, bumpers have often been provided with a bumper fascia panel mounted to the bumper that extends across the bumper and wraps around the corners of the bumper. Fender panels are often attached to the ends of the bumper fascia panels in a relatively smooth manner to integrate the bumpers into the overall outer shape of the vehicle body.

In a larger vehicle, such as SUVs, the bumper fascia panels may be larger and heavier than bumper fascia panels for smaller vehicles, such as automobiles. Furthermore, because the fender body panels of SUVs are typically higher than fender body panels in automobiles, installation of bumper fascia panels in SUVs may be more difficult than in automobiles. Also, a larger bumper fascia panel may be mounted to the frame of the larger vehicle at a distance that is larger than a distance at which a smaller bumper fascia panel is mounted to the frame of a smaller vehicle. This may cause the bumper fascia panel to sag over time due to material fatigue.

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY

Accordingly, in view of the state of the known technology, one aspect of the present invention is to provide a vehicle body structure including a bumper fascia panel and a fascia support bracket. The bumper fascia panel includes a side fascia section and a front end fascia section. The front end fascia section is integrally formed with the side fascia section as a one-piece member having an inboard surface and an outboard surface. The side fascia section includes an upper fascia portion and a lower fascia portion defining a fascia cutout in the side fascia section such that the upper fascia portion and the lower fascia portion at least partially surround a vehicle lamp area. The fascia support bracket includes a side fascia support and a front end fascia support. The front end fascia support is contoured to support the inboard surface of the bumper fascia panel along the front end fascia section. The side fascia support includes an upper support portion that is contoured to support the inboard surface of the bumper fascia panel along the upper fascia portion and a lower support portion that is contoured to support the inboard surface of the bumper fascia panel along the lower fascia portion. The upper support portion and the lower support portion define a support cutout in the side fascia support such that the upper support portion and the lower support portion at least partially surround the vehicle lamp area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
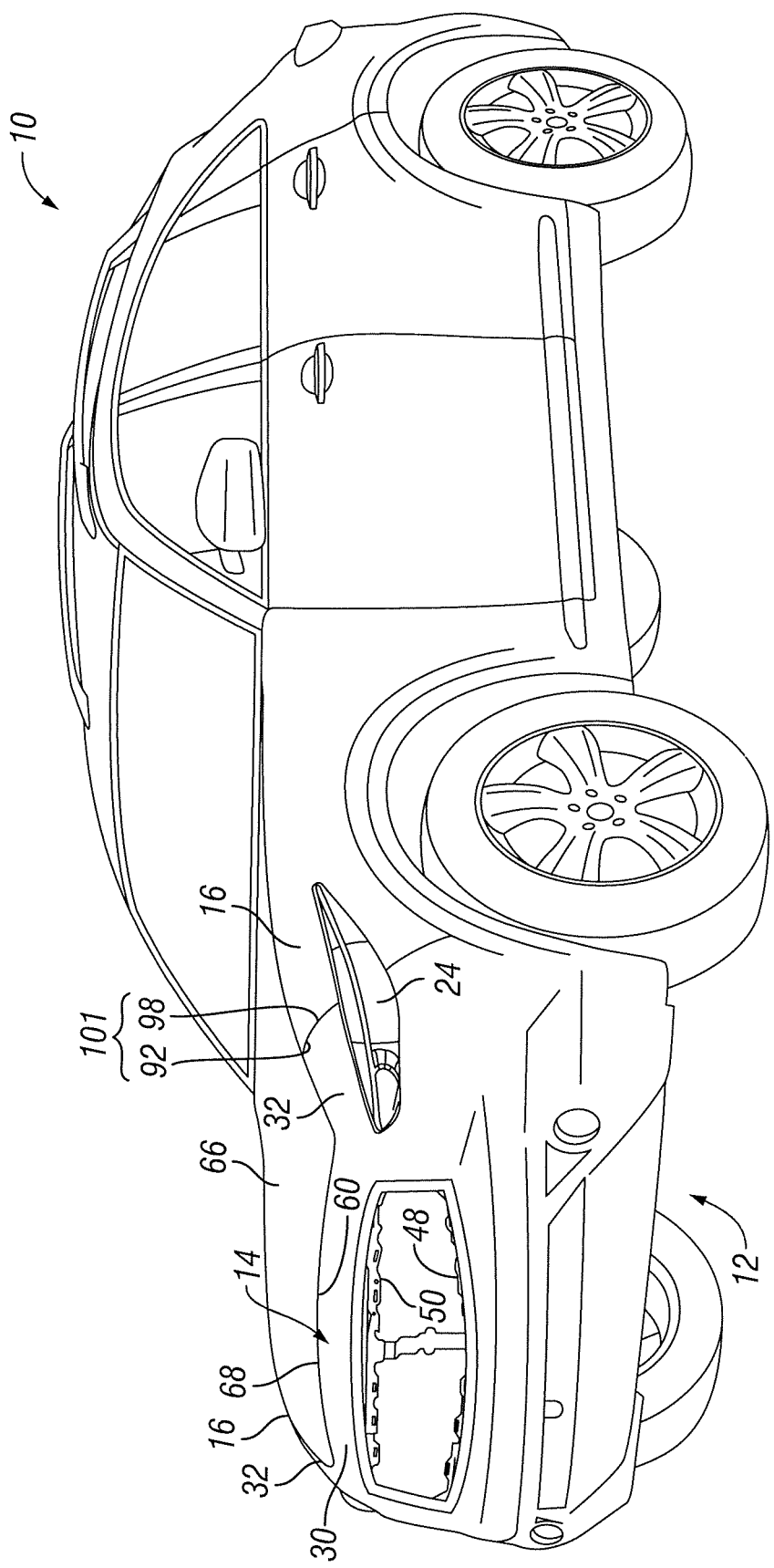
FIG. 1 is a front perspective view of a vehicle equipped with a vehicle front end body structure having a fascia support bracket for supporting a bumper fascia panel, and a mounting flange attachment arrangement for coupling the bumper fascia panel to fender body panels in accordance with a disclosed embodiment.
Figure 2:
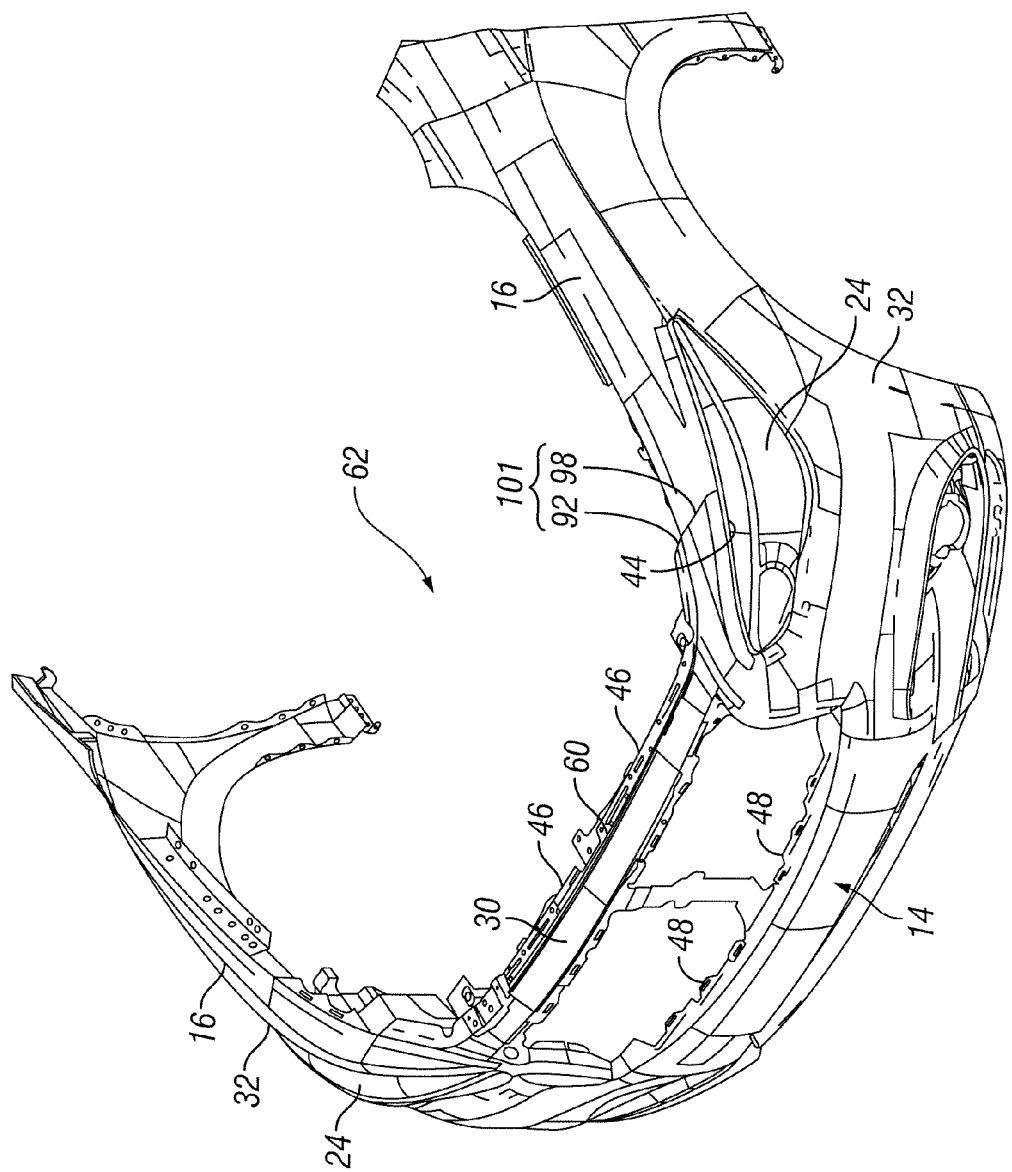
FIG. 2 is a partial front perspective view of selected parts of the vehicle body structure illustrated in FIG. 1 including the bumper fascia panel and the front fender body panels.
Figure 3:
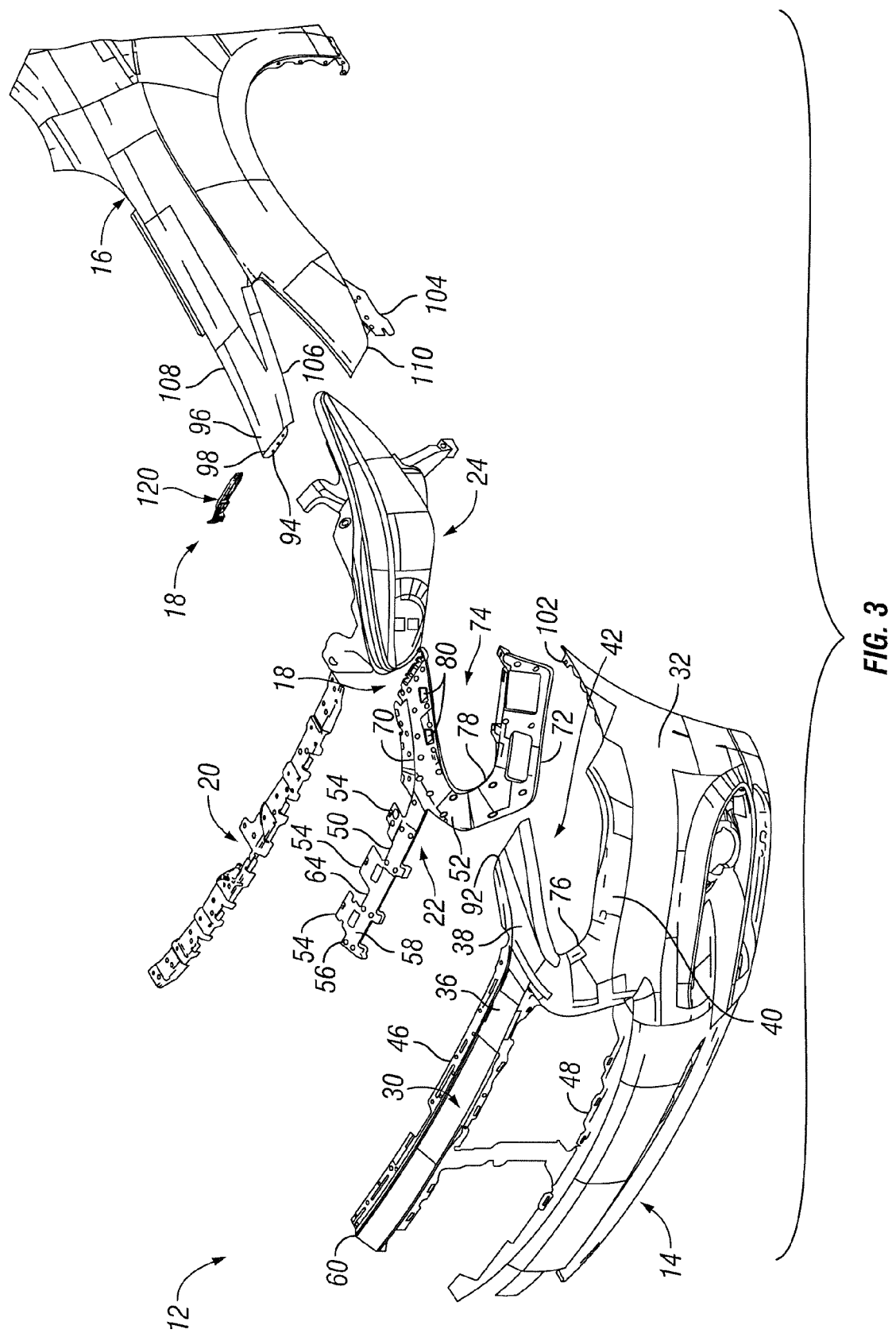
FIG. 3 is an exploded front perspective view of selected parts of the vehicle body structure illustrated in FIGS. 1 and 2.

Referring initially to FIGS. 1-3, an automotive vehicle 10 is illustrated with a vehicle front end body structure 12 in accordance with one embodiment. The vehicle 10 can be, for example, an SUV, an automobile, a truck, a van or any other suitable vehicle. The vehicle 10 is conventional, except for the vehicle front end body structure 12 as described herein. Accordingly, the vehicle 10 and its various parts will not be discussed and/or illustrated in detail herein, except as related to the vehicle front end body structure 12.

As illustrated, the vehicle front end body structure 12 basically includes a bumper fascia panel 14, a pair of fender body panels 16 and a pair of mounting flange attachment arrangements 18 (only one shown). The mounting flange attachment arrangements 18 are used to securely fasten upper parts of the bumper fascia panel 14 to the fender body panels 16 such that the bumper fascia panel 14 mates with the fender body panels 16 to form smooth seams therebetween (e.g., a high level of fit and finish). The flange attachment arrangements 18 also assist in stiffening the upper parts of the bumper fascia panel 14 as discussed below.

The fender body panels 16 are preferably mirror images of each other. Thus, only one of the fender body panels 16 (the left or "driver's side" fender body panel 16) will be discussed in detail herein. However, it will be apparent to those skilled in the automotive art from this disclosure that the descriptions and illustrations of the fender body panel 16 apply to both of the fender body panels 16. Furthermore, it will be apparent to those skilled in the automotive art from this disclosure that the fender body panels 16 are attached to the mounting flange attachment arrangements 18 in identical manners, except they are attached in mirror image configurations. Also, the left and right mounting flange attachment arrangements 18 are identical to each other, but for being mirror images of each other. Thus, only the left mounting flange attachment arrangements 18 will be discussed in detail herein.

The vehicle front end body structure 12 is configured to be fixedly attached to a main front bumper member (not shown) of the vehicle 10 to form part of a front bumper structure of the vehicle 10. However, even though the vehicle front end body structure 12 is illustrated at the front of the vehicle 10 in this embodiment, it will be apparent to those skilled in the automotive art from this disclosure can applied to the rear of a vehicle (i.e. the rear bumper) as needed and/or desired.

The vehicle front end body structure 12 also includes an upper vehicle bumper fascia retainer 20, a pair of fascia support brackets 22 and a pair of head lamp units 24 as well as other parts (not shown). The left and right fascia support brackets 22 and the left and right head lamp units 24 are identical to each other, but for being mirror images of each other. Thus, only the left support bracket 22 and the left head lamp unit 24 will be discussed in detail herein.

The upper vehicle bumper fascia retainer 20 can be attached to and supported by a radiator core support (not shown) that constitutes part of a vehicle front end module that supports the bumper fascia panel 14. Also, the upper vehicle bumper fascia retainer 20 can be attached to and supported by any other suitable component of the vehicle front end body structure 12. The head lamp units 24 are mounted in the vehicle front end body structure 12 in a conventional manner, and support the respective support brackets 22 as discussed in more detail below. Also, constructions of the radiator core support, the upper vehicle bumper fascia retainer 20 and the head lamp units 24 vary depending upon the vehicle body styling as well as other design considerations. Thus, the radiator core support, the upper vehicle bumper fascia retainer 20 and the head lamp units 24 will not be discussed in further detail except as they relate to the bumper fascia panel 14 and the fascia support brackets 22 as described herein.

Basically, as seen in FIGS. 1 and 3, the bumper fascia panel 14 is a one-piece, unitary member formed of a thin, lightweight sheet material such as a rigid plastic material (e.g., a thermoplastic olefin elastomer) or any other suitable material. In any case, the bumper fascia panel 14 should be constructed of a self supporting material with a degree of flexibility such that the bumper fascia panel 14 is flexible yet maintains its shape. The bumper fascia panel 14 covers a rigid bumper member (not shown). The bumper fascia panel 14 includes an elongated front end fascia section 30 and a pair of side fascia sections 32. The front end fascia section 30 is integrally formed with the side fascia sections 32 as a one-piece member having an inboard surface 34 (see, e.g., FIG. 4) and an outboard surface 36. Since the bumper fascia panel 14 is generally formed of a thin sheet material, the shape of the inboard surface 34 generally follows the shape of the outboard surface 36. Typically, the inboard surface 34 and outboard surface 36 can have curved portions as viewed in transverse cross-section, such that in areas where the inboard surface 34 is concave the outboard surface 36 is convex and vice-versa.

The side fascia sections 32 are arranged at opposite ends of the front end fascia section 30 such that the bumper fascia panel 14 has a wide, substantially U-shaped overall profile as viewed from above (FIG. 3). Each side fascia section 32 includes an upper fascia portion 38 and a lower fascia portion 40 defining a fascia cutout 42 in the side fascia section 32. The upper fascia portion 38 extends transverse to the lower fascia portion 40. The upper fascia portion 38 and the lower fascia portion 40 at least partially surround a vehicle lamp area 44 in which a head lamp unit 24 is mounted. The side fascia sections 32 are preferably mirror images of each other. Thus, only one of the side fascia sections 32 will be discussed in detail herein. However, it will be apparent to those skilled in the automotive art from this disclosure that the descriptions and illustrations apply to both of the side fascia sections 32.

As seen in FIGS. 2 and 3, for example, the front end fascia section 30 of the bumper fascia panel 14 has an upper transverse mounting flange 46 and a lower transverse mounting flange 48. The upper transverse mounting flange 46 is fastened to the upper vehicle bumper fascia retainer 20 via fascia support brackets 22 by a plurality of fasteners (not shown) such as rivets, screws, bolts and so, on as discussed in more detail below. The lower transverse mounting flange 48 is fastened to a lower vehicle bumper fascia retainer (not shown) by a plurality of fasteners (not shown) such as rivets, screws, bolts and so on. The lower vehicle bumper fascia retainer can be fixedly attached to the lower end of the radiator core support (not shown).

As further illustrated, a fascia support bracket 22 includes a front end fascia support 50 and a side fascia support 52. The front end fascia support 50 is integrally formed with the side fascia support 52 as a one-piece member. The fascia support bracket 22 can be formed of a rigid material, such as a hard plastic or composite, metal or any other suitable material. The fascia support bracket 22 can also include a ribbed structure 53 (see, e.g., FIGS. 9, 10, 20 and 21) including a plurality of diagonally crossing ribs that provide structural reinforcement and strength to the fascia support bracket 22. The front end fascia support 50 is contoured to support the inboard surface 34 of the bumper fascia panel 14 along the front end fascia section 30. Also, the front end fascia support 50 of the left fascia support bracket 22 and the front end fascia support 50 of the right fascia support bracket 22 extend toward each other and are each configured and arranged to be attached to a vehicle body portion as described herein.

Furthermore, the front end fascia support 50 includes a front end module attachment structure 54. Accordingly, the upper transverse mounting flange 46 of the front end fascia section 30 and the front end module attachment structure 54 can be coupled to the upper vehicle bumper fascia retainer 20 by a plurality of fasteners (not shown) such as rivets, screws, bolts and so on, as understood in the art. The front end fascia support 50 can be coupled to the inboard surface 34 of the front end fascia section 30 by a plurality of fasteners (not shown) such as rivets, screws, bolts and so on, as understood in the art.

In addition, the fascia support bracket 22 includes a plurality of projections 56 that extend outwardly from an outboard surface 58 of the front end fascia support 50 and the side fascia support 52. The projections 56 contact the inboard surface 34 of the bumper fascia panel 14 to thus support the bumper fascia panel 14. While the fascia support bracket 22 is being installed to the inboard surface 34 of the bumper fascia panel 14, the projections 56 can be tuned to account for manufacturing tolerances of the fascia support bracket 22 and the bumper fascia panel 14, to provide optimum contact between the fascia support bracket 22 and the bumper fascia panel 14.

Also, the bumper fascia panel 14 includes an upper peripheral fascia edge 60 that defines a portion of a vehicle hood opening 62. Likewise, the fascia support bracket 22 includes an upper peripheral support edge 64 that extends past the upper peripheral fascia edge 60 into the vehicle hood opening 62. Accordingly, when the hood 66 of the vehicle 10 is closed, the front peripheral edge 68 of the hood 66 aligns with the upper peripheral fascia edge 60 with a high level of fit and finish.

The side fascia support 52 includes an upper support portion 70 that is contoured to support the inboard surface 34 of the bumper fascia panel 14 along the upper fascia portion 38. The side fascia support 52 further includes a lower support portion 72 that is contoured to support the inboard surface 34 of the bumper fascia panel 14 along the lower fascia portion 40. The upper support portion 70 extends transverse to the lower support portion 72. The upper support portion 70 is coupled to the inboard surface 34 of the upper fascia portion 38 and the lower support portion 72 is coupled to the inboard surface 34 of the lower fascia portion 40. Also, the upper support portion 70 and the lower support portion 72 define a support cutout 74 in the side fascia support 52 such that the upper support portion 70 and the lower support portion 72 at least partially surround the vehicle lamp area 44.

That is, the side fascia section 32 has a peripheral edge 76 that extends along the upper fascia portion 38 and lower fascia portion 40 to define the fascia cutout 42. Also, the side fascia support 52 has a peripheral edge 78 that extends along the upper support portion 70 and the lower support portion 72 to define the support cutout 74. The peripheral edge 76 of the side fascia section 32 and the peripheral edge 78 of the side fascia support 52 have a corresponding shape as indicated. Also, the peripheral edge 78 of the side fascia support 52 is disposed adjacent to the peripheral edge 76 of the side fascia section 32.

Figure 12:
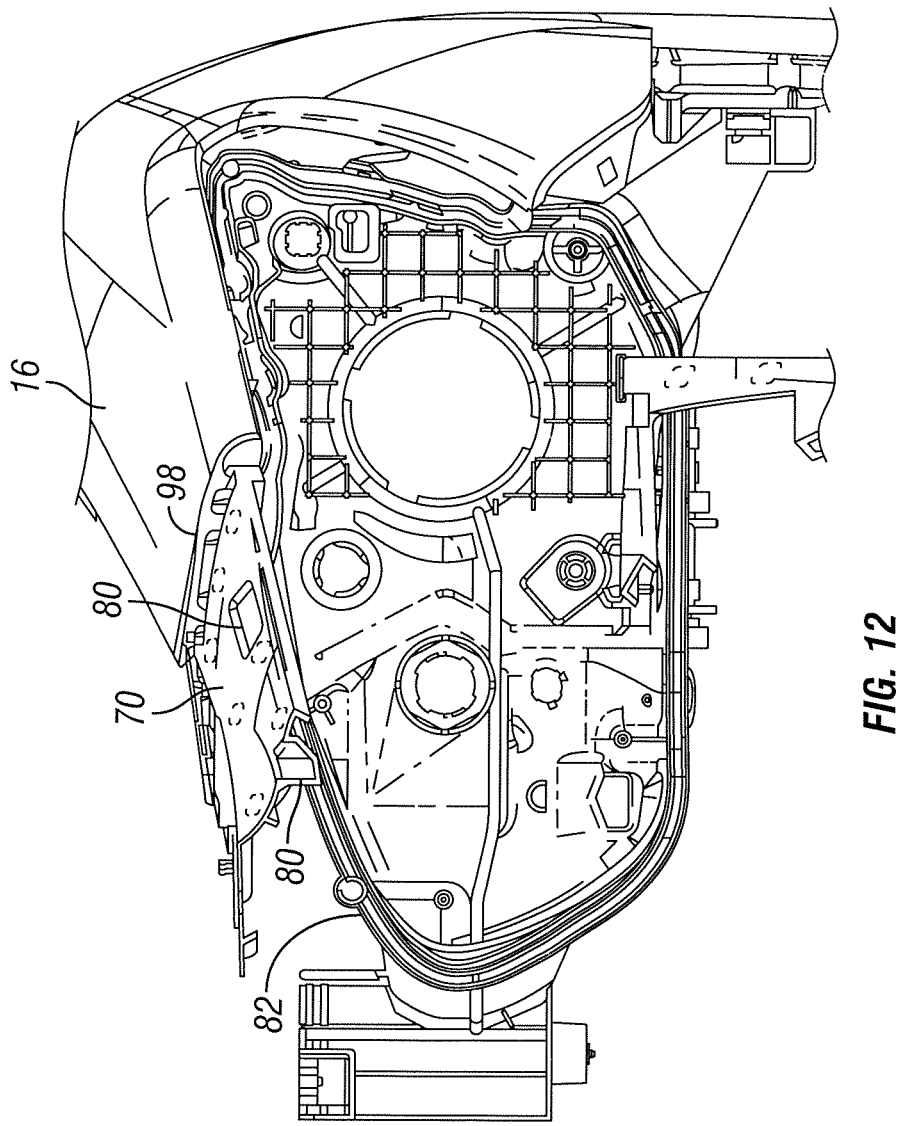
FIG. 12 is another detailed front perspective view of the lamp area at the front left side of the vehicle body structure shown in FIG. 11.
Figure 13:
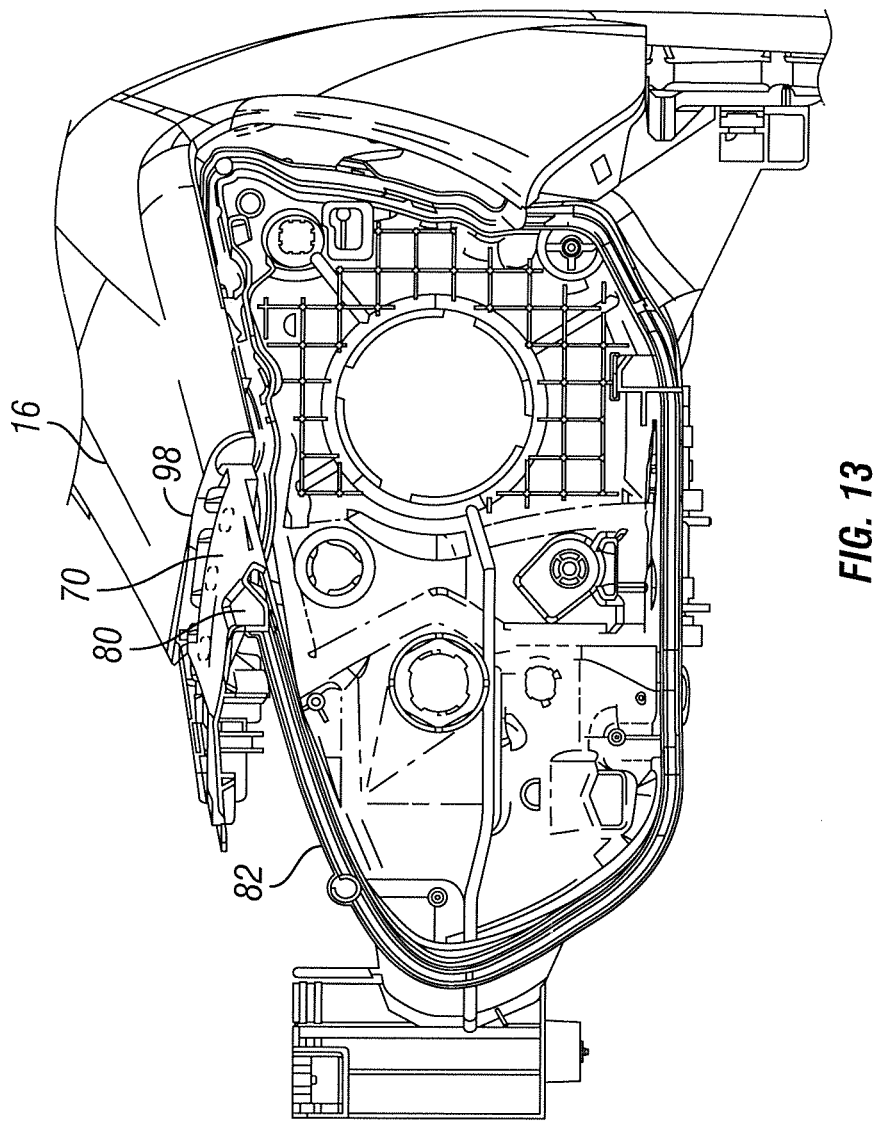
FIG. 13 is a further detailed front perspective view of the lamp area at the front left side of the vehicle body structure shown in FIG. 11.
Figure 14:
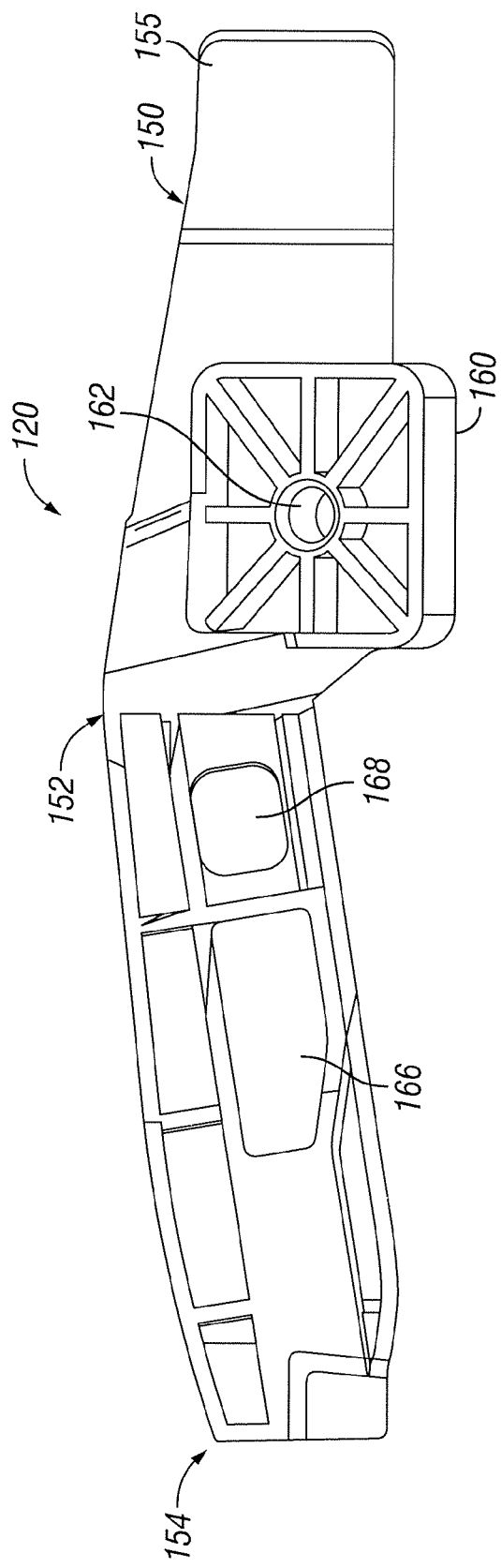
FIG. 14 is a detailed elevational view of one side of the fender attachment bracket that is attached at the left side of the vehicle body structure illustrated in FIGS. 1 to 3.

In addition, the upper support portion 70 includes at least one standoff 80 that is configured and arranged relative to the support cutout 74 to contact a lamp unit support 82 that is mounted in the vehicle lamp area 44 such that the lamp unit support 82 supports the upper support portion 70 and the upper fascia portion 38. More particularly, the upper support portion 70 includes a plurality of standoffs 80 that are configured and arranged relative to the support cutout 74. That is, the standoffs 80 are spaced from each other along the support cutout 74 to contact the lamp unit support 82 such that the lamp unit support 82 further supports the upper support portion 70 and the upper fascia portion 38 as shown, for example, in FIG. 12.

Furthermore, the lower support portion 72 includes an attachment structure 84 that is configured and arranged relative to the support cutout 74 to be attached to the lamp unit support 82 such that the lamp unit support 82 supports the lower support portion 72 and the lower fascia portion 40. In particular, the attachment structure 84 can include includes a plurality of attachments 86 that are spaced apart from each other and configured and arranged to be attached to respective areas of the lamp unit support 82.

In addition, as discussed above, the flange attachment arrangement 18 is used to securely fasten the bumper fascia panel 14 to the fender body panels 16. As shown, for example, in FIGS. 3 to 5, the upper fascia portion 38 of the side fascia section 32 includes a bumper fascia mounting flange 90 extending in an inboard direction to a free edge from the outboard surface 36 of the bumper fascia panel 14 at an angle to form an outboard abutment edge 92 (first outboard abutment edge) between the outboard surface 36 and the fascia mounting flange 90. In this example, the bumper fascia mounting flange 90 extends generally perpendicular to the outboard surface 36, but can extend at any suitable angle that can accomplish the mounting features described herein. The outboard abutment edge 92 is visible from an exterior view of the vehicle body structure 12.

The fender body panel 16 includes a fender mounting flange 94 that extends in an inboard direction to a free edge from an outboard fender surface 96 at an angle to form an outboard abutment edge 98 (second outboard abutment edge) between the outboard fender surface 96 and the fender mounting flange 94. In this example, the fender mounting flange 94 extends generally perpendicular to the outboard fender surface 96, but can extend at any suitable angle that can accomplish the mounting features described herein. Moreover, since the fender body panel 16 is generally formed of a thin sheet material, the shape of the outboard fender surface 96 generally follows the shape of an inboard fender surface 100. Typically, the outboard fender surface 96 and inboard fender surface 100 can have curved portions as viewed in transverse cross-section, such that in areas where the outboard fender surface 96 is concave the inboard fender surface 100 is convex and vice-versa.

Thus, the outboard surface 36 of the upper fascia portion 38 mates with the outboard fender surface 96 of the fender body panel 16 to form a smooth seam 101 therebetween when they are fixedly coupled together by using the mounting flange attachment arrangement 18. Furthermore, the outboard abutment edges 92 and 98 are positioned adjacent to each other and remain visible from the exterior view of the vehicle body structure 12.

Therefore, as discussed in more detail below, the bumper fascia mounting flange 90 is configured to couple to a first part of one of the fender body panels 16, namely, the fender mounting flange 94. In addition, the lower fascia portion 40 includes a lower fascia mounting flange 102 that extends to a free edge. The lower fascia mounting flange 102 is configured to connect to a second part of one of the fender body panels 16, such as a lower fender mounting flange 104, that extends from the fender body panel 16 to a free edge. The lower fascia mounting flange 102 is fastened to the second part of one of the fender body panels 16 by one or more fasteners (not shown) such as conventional body clips, rivets, bolts, screws and so on.

The fender body panel 16 also includes an exterior head lamp edge 106 that at least partially surrounds the vehicle lamp area 44 in which the head lamp unit 24 is mounted. The fender body panel 16 also defines an exterior hood edge 108 that defines part of the vehicle hood opening 62. In particular, the exterior hood edge 108 meets with the upper peripheral fascia edge 60 to define a portion of the vehicle hood opening 62. The exterior head lamp edge 106 extends between the fender mounting flange 94 and another free end 110 of the fender body panel 16 proximate to the lower fender mounting flange 104. The exterior head lamp edge 106 also joins with the outboard abutment edge 98 to define at least an upper edge of a head lamp opening that is visible from the exterior view of the vehicle front end body structure 12. The peripheral edge 76 of the side fascia section 32 and the exterior head lamp edge 106 of the fender body panel 16 meet together to completely encircle the vehicle lamp area 44. Accordingly, as discussed above, the side fascia support 52 engages the lamp unit support 82 on three sides, namely, the upper, lower and front sides, and the exterior head lamp edge 106 of the fender body panel 16 engages the lamp unit support 82 on the rear side. Furthermore, the side fascia support 52 attaches to the fender body panel 16 under the headlamp at lower fender mounting flange 104. Thus, this arrangement maintains a constant fit around the lamp unit support 82, and improves the fit and finish of the lamp unit 24 to the bumper fascia panel 14. Furthermore, this arrangement of the fascia support bracket 22 and, in particular, the side fascia support 52 allows for flexible tuning of the area around the head lamp unit 24 for the purpose of energy management. For example, the side fascia support 52 provides added rigidity in areas surrounding the head lamp unit 24 to improve customer feel and enhance relative protection to the head lamp unit 24 under low speed impact.

Figure 4:
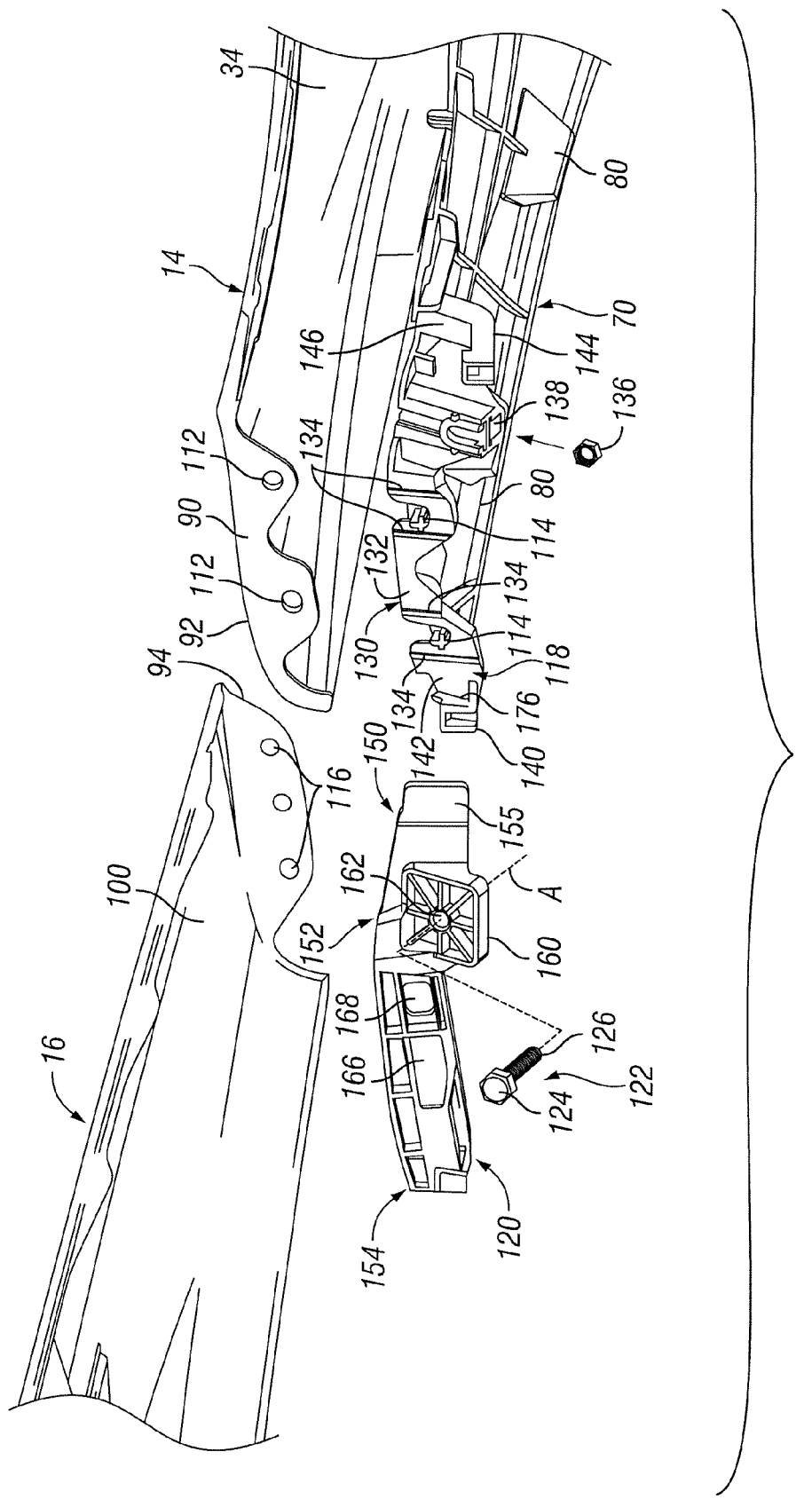
FIG. 4 is an exploded partial rear perspective view of selected parts of the left side of the vehicle body structure illustrated in FIGS. 1 to 3.
Figure 5:
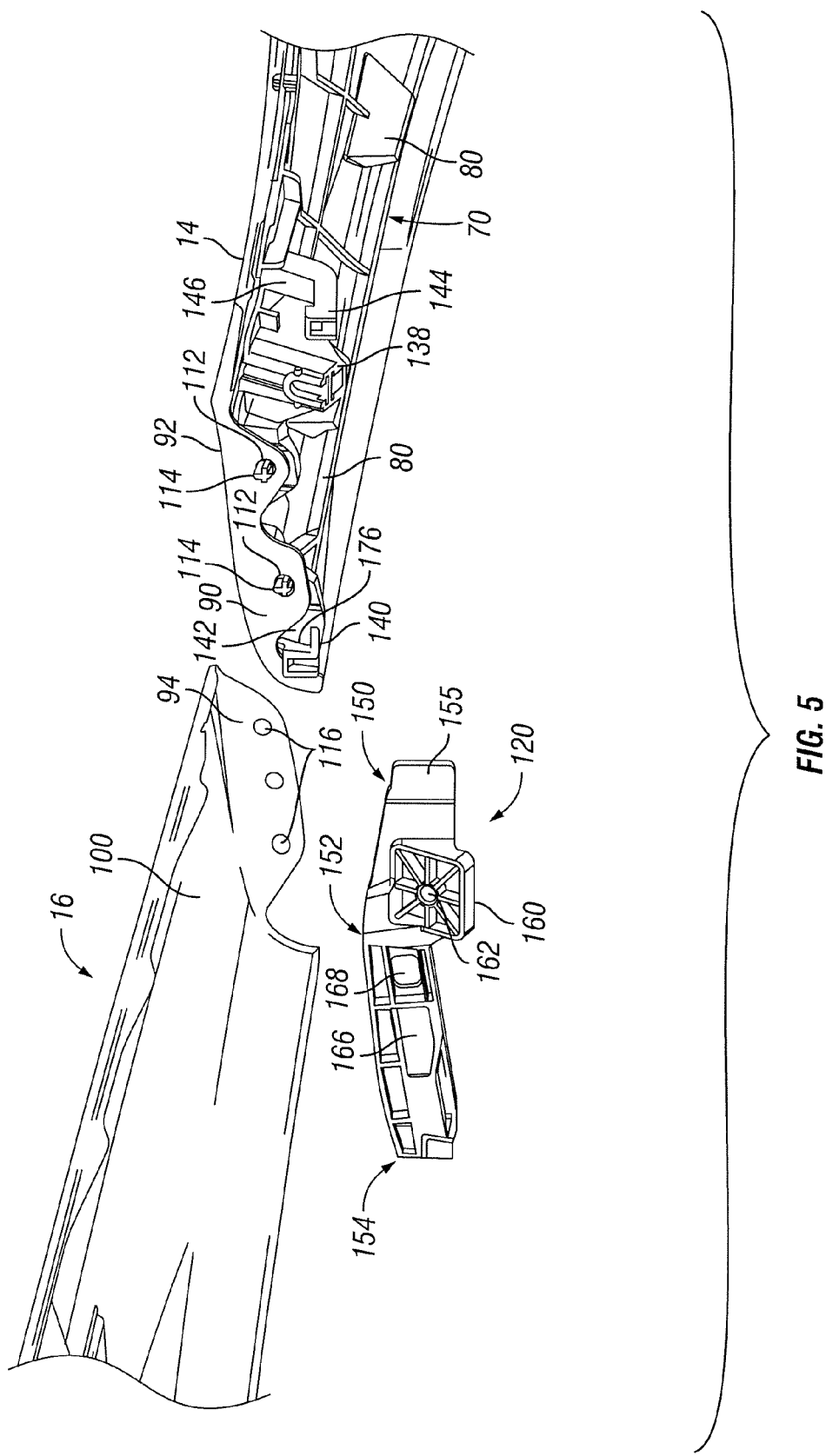
FIG. 5 is a rear perspective view of selected parts of the left side of the vehicle body structure illustrated in FIGS. 1 to 3, showing the bumper fascia panel assembled to the fascia support bracket.
Figure 6:
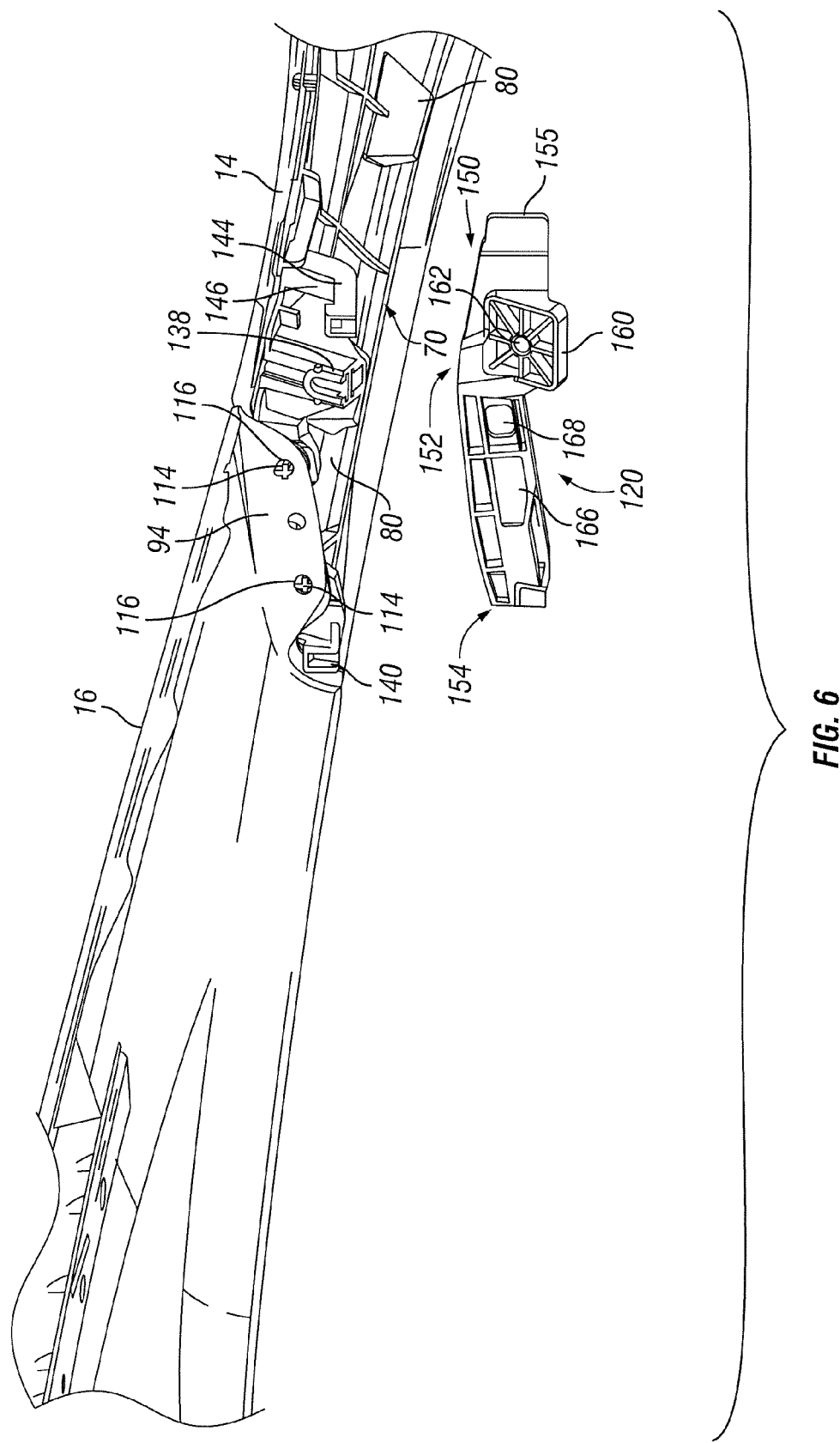
FIG. 6 is a rear perspective view of selected parts of the left side of the vehicle body structure illustrated in FIGS. 1 to 3, showing the bumper fascia panel assembled to the fascia support bracket and a flange of the left fender body panel abutted against a flange of the bumper fascia panel.

As seen in FIGS. 4 to 6, the bumper fascia mounting flange 90 includes a plurality of mounting apertures or holes 112. Also, the upper support portion 70 includes a plurality of locating projections 114 that are each received in a respective mounting hole 112. In addition, the fender mounting flange 94 includes a plurality of mounting apertures or holes 116 that correspond to the mounting holes 112. Accordingly, as shown in FIG. 6, for example, the plurality of locating projections 114 are also each received in a respective mounting hole 116. Thus, the mounting holes 112 and 116 and the locating projections 114 cooperate with the mounting flange attachment arrangement 18 to provide proper alignment with the fender body panel 16 to ensure a reliable connection with a smooth transition between the outboard surfaces of the bumper fascia panel 14 and the fender body panel 16.

Referring to FIGS. 3 to 9, for example, the mounting flange attachment arrangement 18 basically includes at least a first fastening member portion 118 (first fastening member 118) of the upper support portion 70 of the side fascia support 52 of the fascia support bracket 22, a fender attachment bracket 120 (second fastening member 120) and a bolt 122. Thus, the side fascia support 52 includes a support mounting structure, which can include first fastening member 118, that is configured and arranged relative to the bumper fascia mounting flange 90 to couple to the fender body panel 16 (fender). The first fastening member 118 overlies the bumper fascia mounting flange 90. The fender attachment bracket 120, which can be referred to as a second fastening member 120, overlies the fender mounting flange 94. The bolt 122 can be referred to as at least part of a fastening element that couples the first and second fastening members 118 and 120 together with the bumper fascia mounting flange 90 and the fender mounting flange 94 being sandwiched between the first and second fastening members 118 and 120.

As further shown, the bolt 122 (fastening element) has a first end 124 including a tool engagement portion, such as the head of the bolt 122, that located on an inboard side of the mounting flange attachment arrangement 18 and a second end located 126 opposite to the first end 124. As discussed in more detail below, a center fastening axis A of the fastening element extends from the second end 126 toward the first end 124 in an upward direction of the vehicle body structure 12. Thus, the mounting flange attachment arrangement 18 can be used in tight areas because the fastening axis A is angled relative to the bumper fascia mounting flange 90 and the fender mounting flange 94 so that a tool (e.g., a wrench or bolt driver) can easily engage the head (e.g., a tool engagement portion) of the bolt 122 for tightening the bolt 122. For example, the fender body panel 16 on an SUV is typically higher than the fender body panel on an automobile. Because an installer typically will reach over the fender body panel 16 when installing the second fastening member 120, the installer may drive the bolt 122 from a position where the installer cannot actually see the bolt 122. Accordingly, the angle of the fastening axis A enables an installer to more easily reach the bolt 122 with an installation tool such as a wrench or bolt driver. Furthermore, in the illustrated embodiment, it is not necessary for any threaded fasteners to extend through the bumper fascia mounting flange 90 and the fender mounting flange 94 (i.e., no threaded fasteners are needed that extend generally perpendicular to the bumper fascia mounting flange 90 and the fender mounting flange 94).

As further shown, the first fastening member 118 includes a flange fastening portion 130 including a surface 132 that overlies the bumper fascia mounting flange 90. When the fender attachment bracket 120 (second fastening member 120) is attached to the first fastening member 118 using the bolt 122, the flange fastening portion 130 assists in retaining the bumper fascia mounting flange 90 and the fender mounting flange 94 together, with the abutment edge 92 mating with the abutment edge 98 to align the outboard surface 36 with the outboard fender surface 96. The locating pins 114 discussed above extend outwardly from the flange fastening portion 130. Also, a plurality of contact ribs 134 extend from the flange fastening portion 130 and directly contact the bumper fascia mounting flange 90 to apply a clamping force against the bumper fascia mounting flange 90 when the bolt 122 is fully tightened.

In addition to the bolt 122, the fastening element can also include a nut 136. As discussed above, the head of the bolt 122 is located at the first end 124 of the fastening element on an inboard side of the first and second fastening members 118 and 120. The nut 136 is installed in a nut receiving recess 138 of the upper support portion 70 of the side fascia support 52 (i.e., in the first fastening member portion 118). Thus, the nut 136 is located at the second end of the fastening element. The nut 136 is arranged to threadedly receive the threaded shaft of the bolt 122. Furthermore, the nut 136 is positioned so that the center fastening axis A of the fastening element is angled in the inboard direction of the vehicle front end body structure 12 with respect to the surface 132 of flange fastening portion 130. Thus, in this example, the nut 136 and the bolt 122 form the fastening element that fixedly connects the first and second fastening members 118 and 120 together to retain the bumper fascia mounting flange 90 and the fender mounting flange 94 between the first and second fastening members 118 and 120.

In addition, the first fastening member 118 includes a first support 140 that extends outwardly from the flange fastening portion 130 at an outboard location of the flange fastening portion 130. The first support 140 thus defines a first support recess 142. The first fastening member 118 also includes a second support 144 that extends outwardly from the flange fastening portion 130 at an inboard location of the flange fastening portion 130. The second support 144 thus defines a first support recess 146. The first and second supports 140 and 144 are discussed in more detail below.

Further details of the fender attachment bracket 120 (second fastening member 120) are shown in FIGS. 4-8 and 14-17. The second fastening member 120 basically includes an inboard end 150, an intermediate flange fastening portion 152 and an outboard end 154. A handling tab 155 can extend from the inboard end 150. The handling tab 155 assists in handling and installation of the second fastening member 120 by providing a gripping point. The second fastening member 120 is preferably integrally formed together as a one-piece, unitary member from a lightweight, rigid material such as a plastic material or any other material that is well known in the automotive art. The second fastening member 120 overlies the fender mounting flange 94 with the bumper fascia mounting flange 90 and the fender mounting flange 94 being sandwiched between the first and second fastening members 118 and 120 as discussed above.

The second fastening member 120 includes a flange fastening portion 156 having a contact face or surface 158 that overlies the fender mounting flange 94 such that the bumper fascia mounting flange 90 and the fender mounting flange 94 are sandwiched between the first and second fastening members 118 and 120 as discussed above. The second fastening member 120 further includes a fastener attachment portion 160 that receives the bolt 122 of the fastening element. The fastener attachment portion 160 extends in a forward direction of the vehicle body structure 12 from the flange fastening portion 156.

The fastener attachment portion 160 is configured relative to the fender mounting flange 94 such that the center fastening axis A is oriented at an upward angle in the upward direction. The fastener attachment portion 160 includes a fastener bore 162 that extends at an angle θ of between forty degrees and eighty degrees with respect to the upward direction of the vehicle body structure 12. In this example, the fastener bore 162 extends at an angle θ of about sixty degrees with respect to the upward direction of the vehicle body structure 12. However, the fastener bore 162 can extend at any suitable angle that will allow for the functionality of the mounting flange attachment arrangement 18 as discussed herein.

Figure 7:
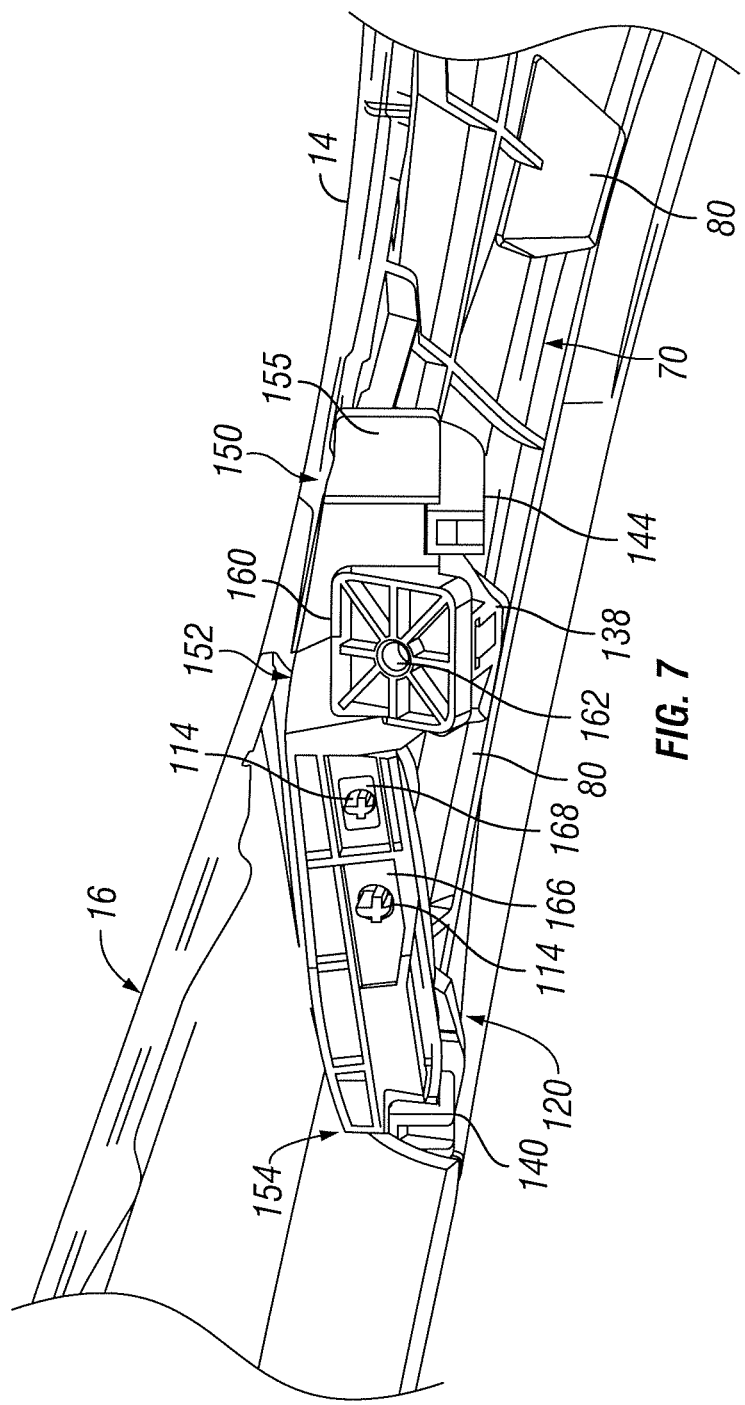
FIG. 7 is a rear perspective view of selected parts of the left side of the vehicle body structure illustrated in FIGS. 1 to 3, showing the bumper fascia panel assembled to the fascia support bracket, a flange of the left fender body panel abutted against a flange of the bumper fascia panel and a fender attachment bracket supported by supports on the fascia support bracket.
Figure 15:
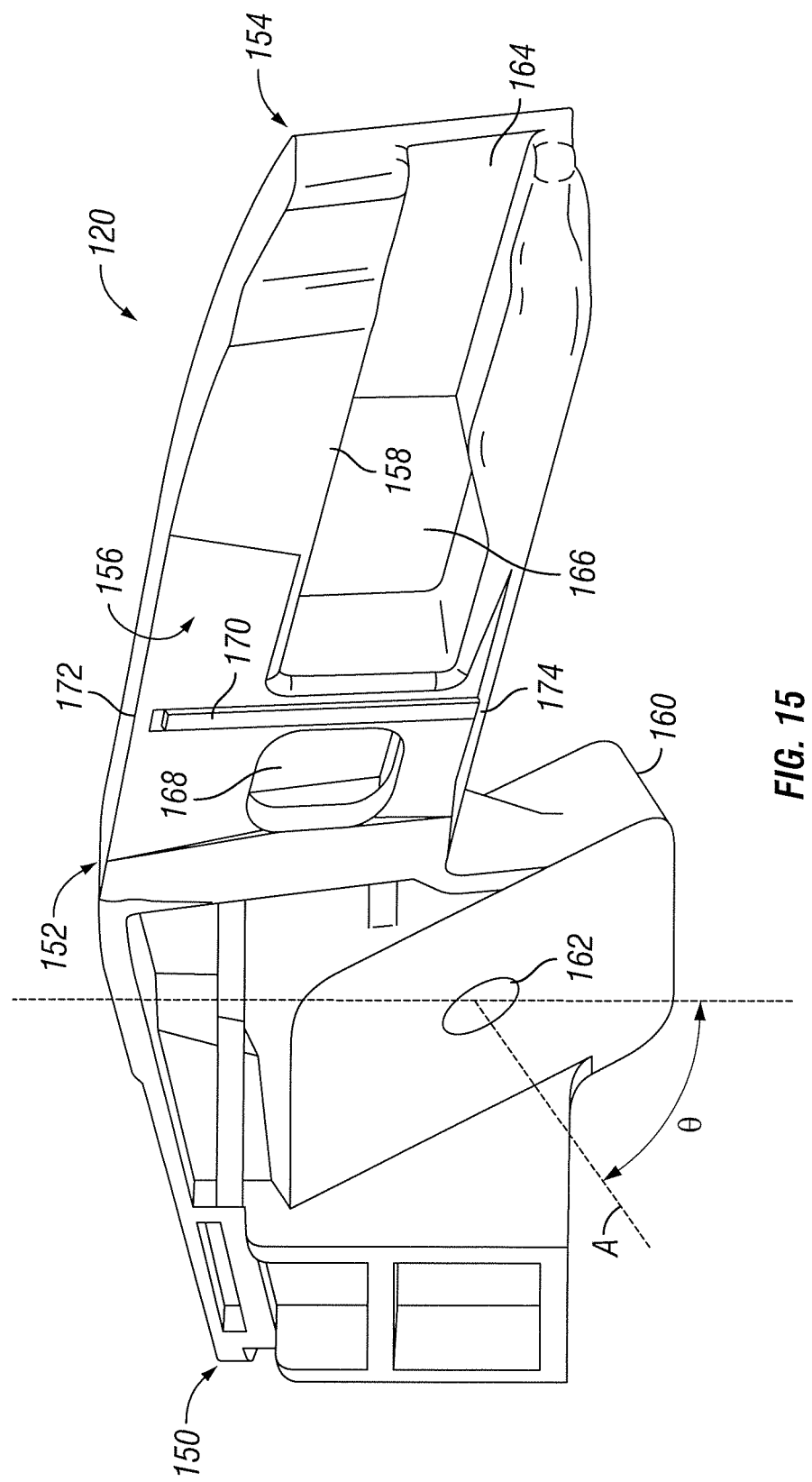
FIG. 15 is a detailed perspective view of another side of the fender attachment bracket opposite to the side of the fender attachment bracket shown in FIG. 14.
Figure 16:
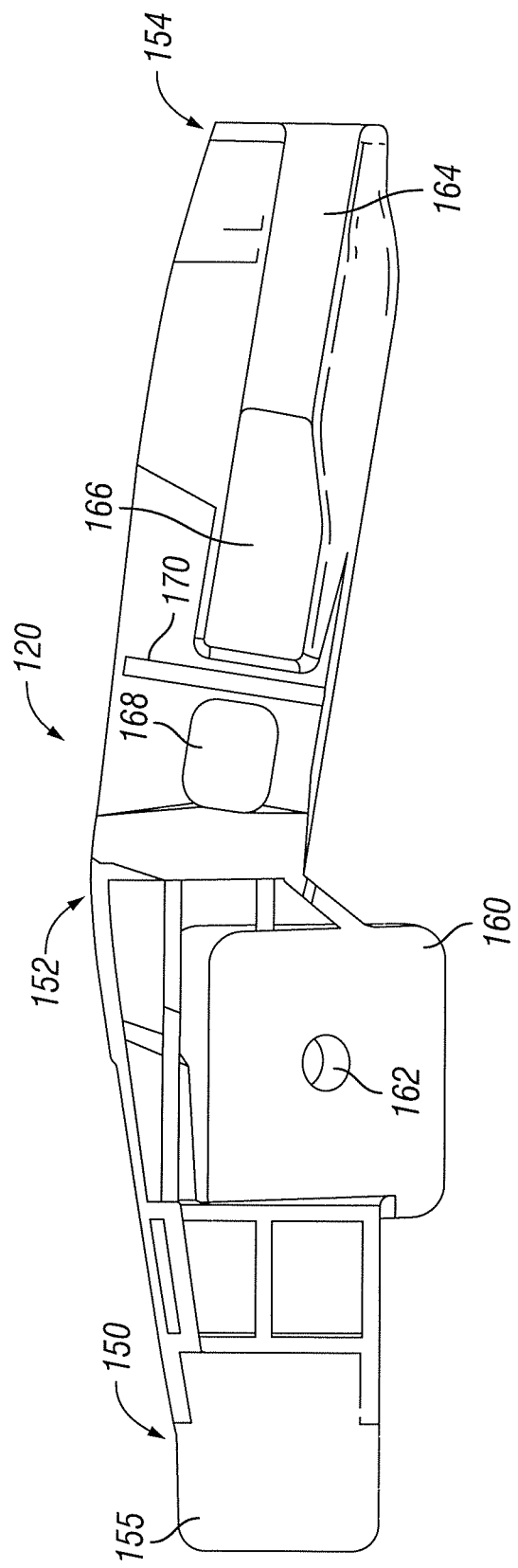
FIG. 16 is a detailed elevational view of the side of the fender attachment bracket shown in FIG. 15.
Figure 17:
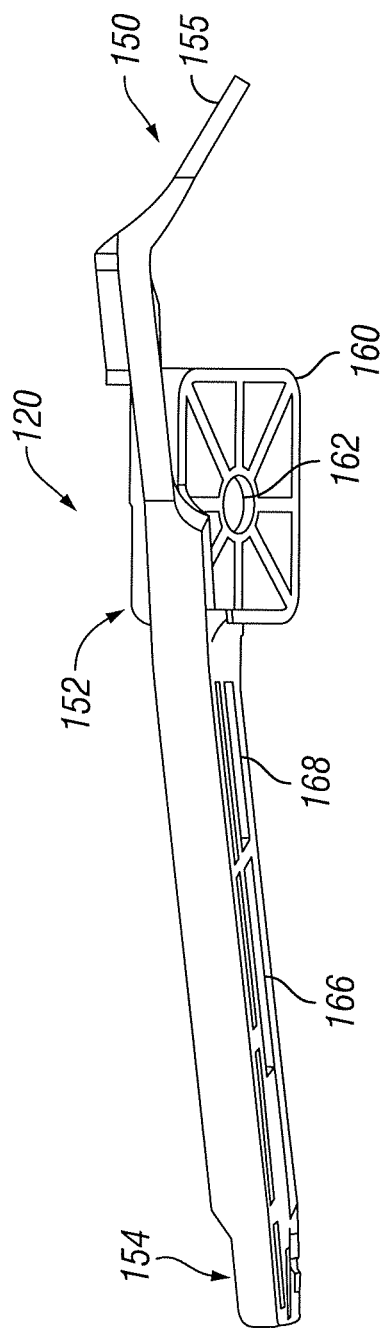
FIG. 17 is a top plan view of the fender attachment bracket shown in FIGS. 14 to 16.
Figure 18:
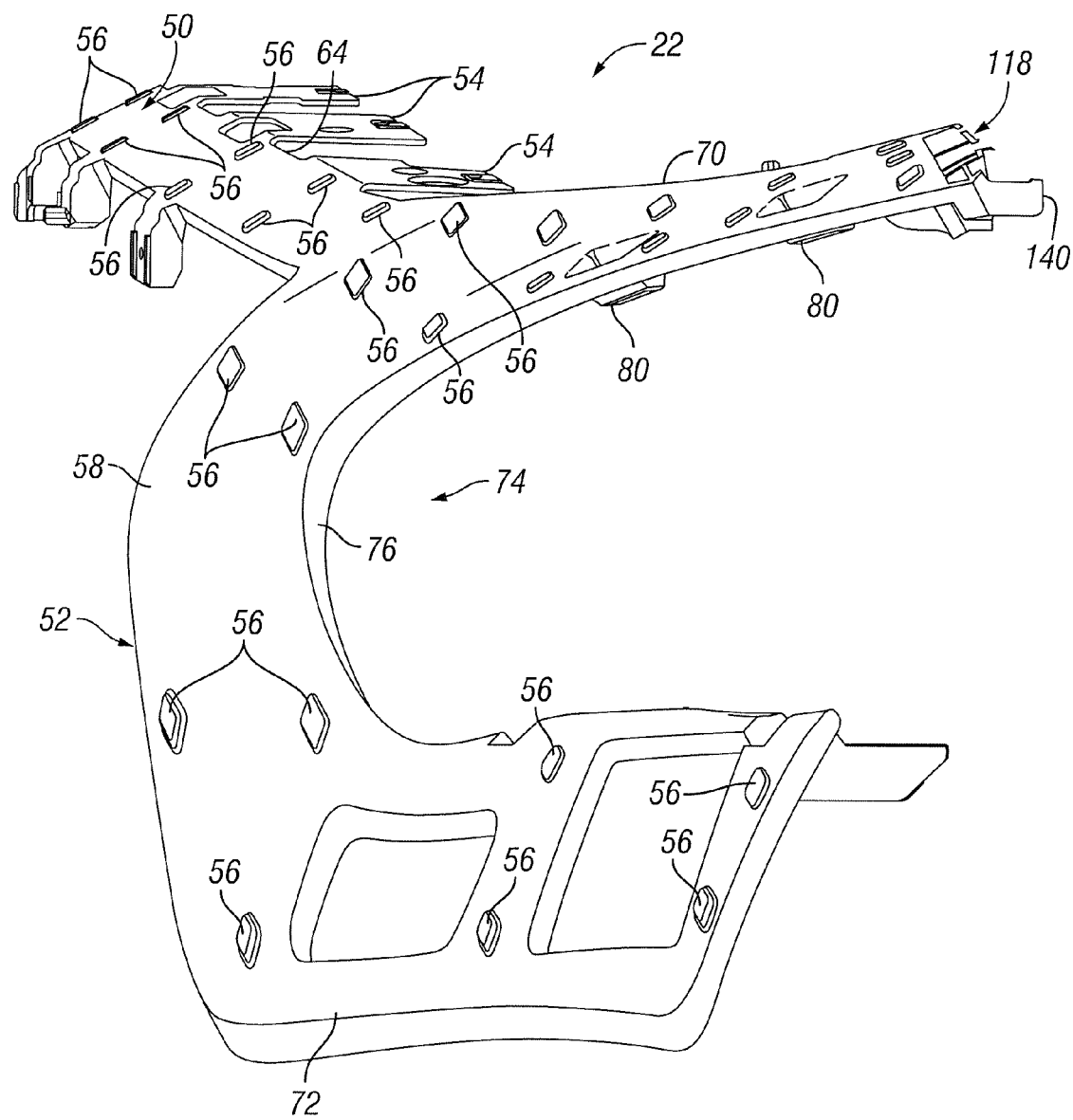
FIG. 18 is a detailed front perspective view of the bumper fascia panel support bracket at the front left side of the vehicle body structure shown in FIGS. 1 to 3.
Figure 19:
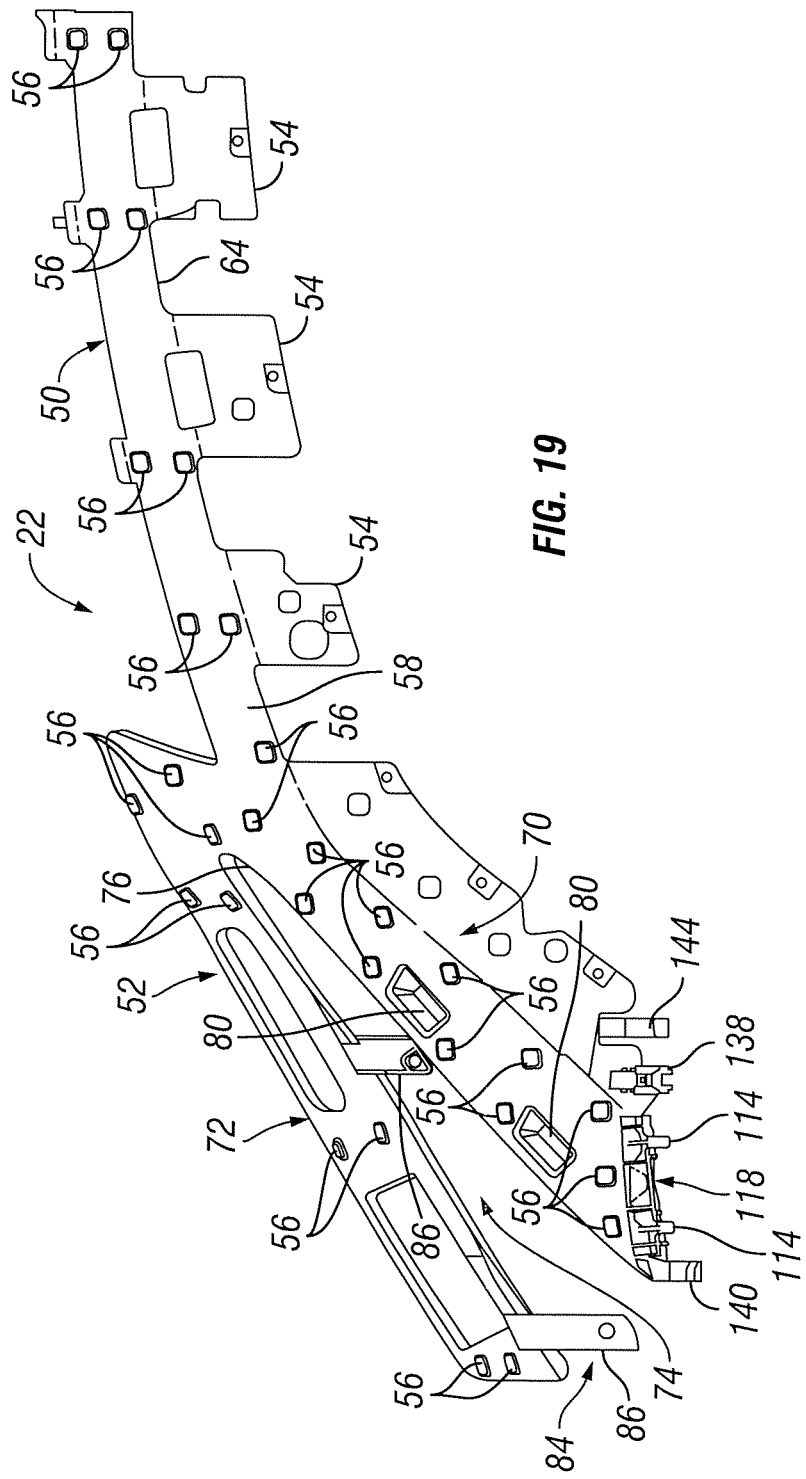
FIG. 19 is a top plan view of the bumper fascia panel support bracket shown in FIG. 18.
Figure 20:
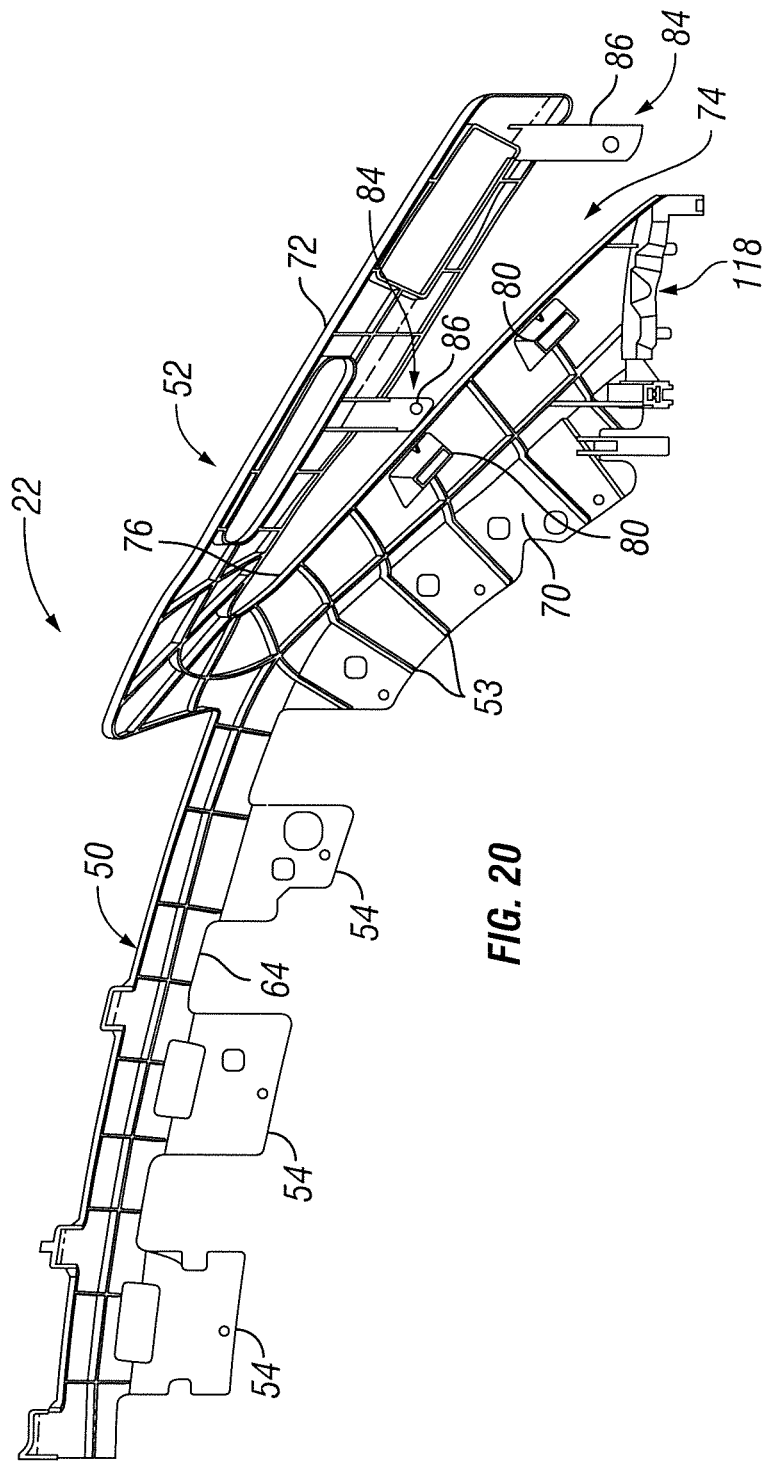
FIG. 20 is a bottom plan view of the bumper fascia panel support bracket shown in FIG. 18.
Figure 21:
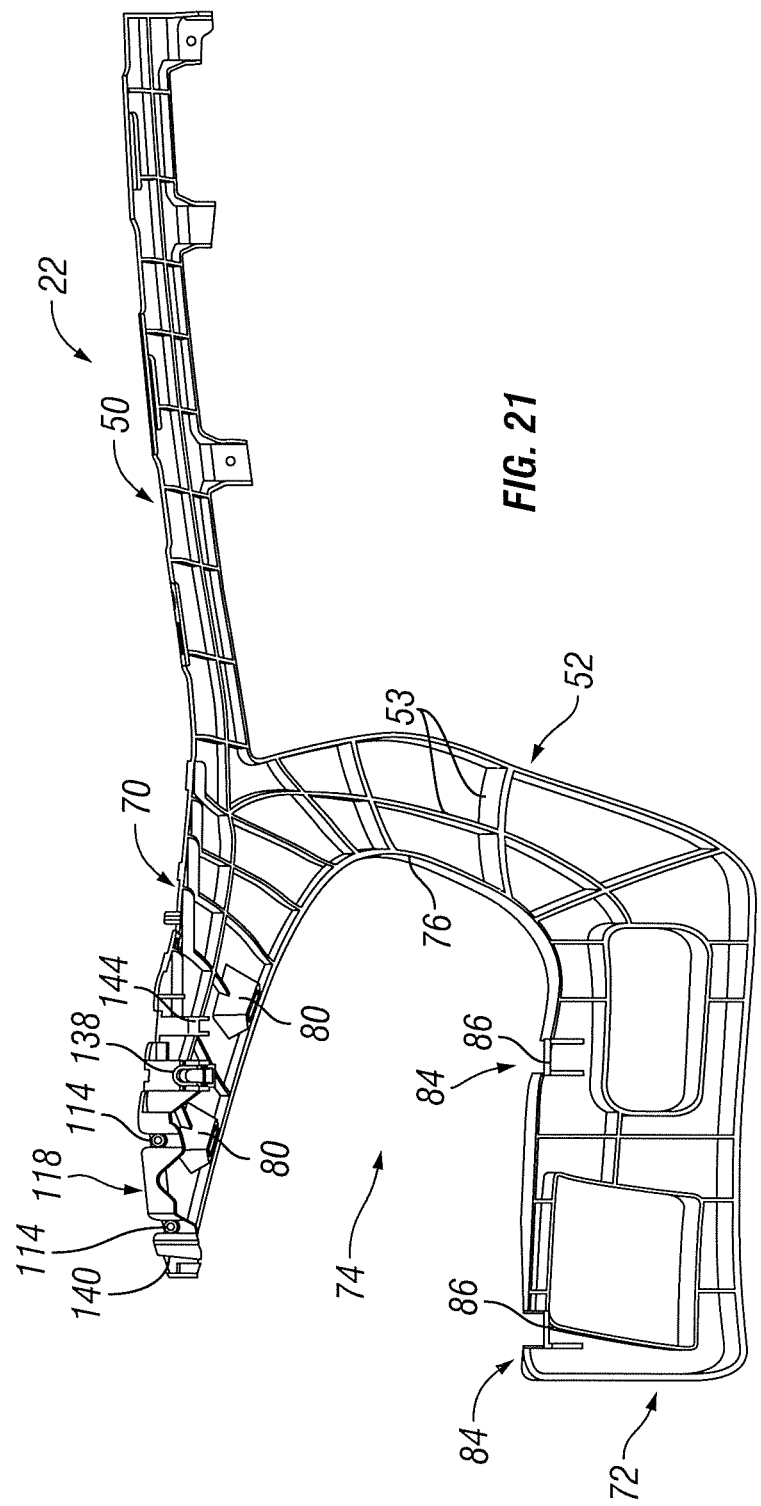
FIG. 21 is a rear elevational view of the bumper fascia panel support bracket shown in FIG. 18.

As shown, in particular, in FIG. 15, the contact surface 158 defines a channel 164 and a locating pin receiving opening 166 through which one of the locating pins 114 extends. The channel is configured and arranged relative to the locating pin receiving opening 166 to receive the locating pin 114 therein while the second fastening member 120 is being installed to overlie the fender mounting flange 94. In this example, the locating pin receiving opening 166 receives the locating pin 114 that is positioned toward the outboard location of the flange fastening portion 130 as shown in FIG. 7. The contact surface 158 further defines another locating pin receiving opening 168 through which the other one of the locating pins 114 extends. In this example, the locating pin receiving opening 168 receives the locating pin 114 that is positioned toward the inboard location of the flange fastening portion 130 as shown in FIG. 7.

As further shown in FIG. 15, the contact face 150 includes a pivot projection 170 that extends outward from the contact face 150 and that contacts the fender mounting flange 94. The pivot projection 170 extends in the upward direction along the flange fastening portion 156 between top and bottom edges 172 and 174, respectively, of the flange fastening portion 156. When the second fastening member 120 is being mounted to the first fastening member 118, the outboard end 154 (first end) is received in the first support recess 142 of the first support 140. Also, the inboard end 150 (second end) is received in the second support recess 146 of the second support 144. Therefore, the first support 140 supports the outboard end 154 (first end) of the second fastening member 120, and the second support 144 supports the inboard end 150 (second end) of the second fastening member 120. As a result, the first support 140 of the first fastening member 118 limits movement of the first end 154 of the second fastening member 120 in a downward direction of the vehicle body structure 12. Thus, the first end 154 of the second fastening member 120 is free of any type of fastener that requires a tool for installation. The second support 144 limits movement of the second end 150 of the second fastening member 120 in the downward direction of the vehicle body structure 12, which allows the fastening member (bolt 122) to be conveniently accessed.

Figure 8:
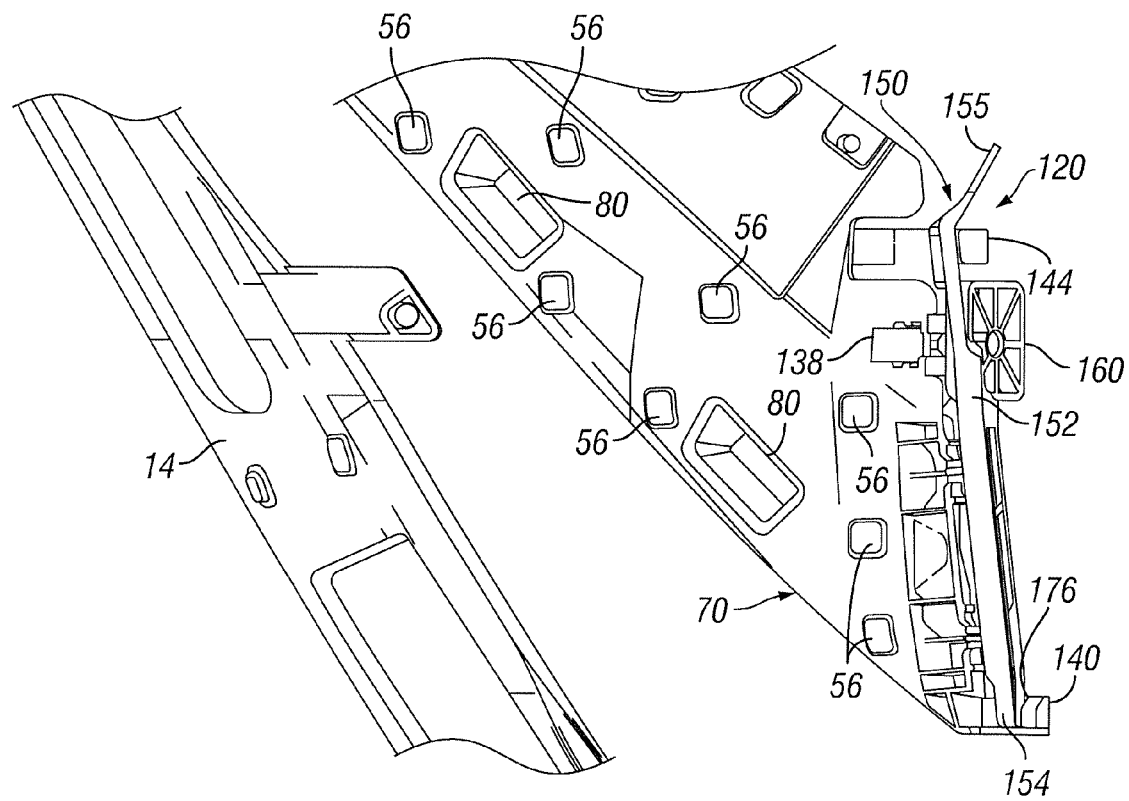
FIG. 8 is a partially exploded top plan view showing the bumper fascia panel removed from the fascia support bracket at the left side of the vehicle body structure illustrated in FIGS. 1 to 3.
Figure 9:
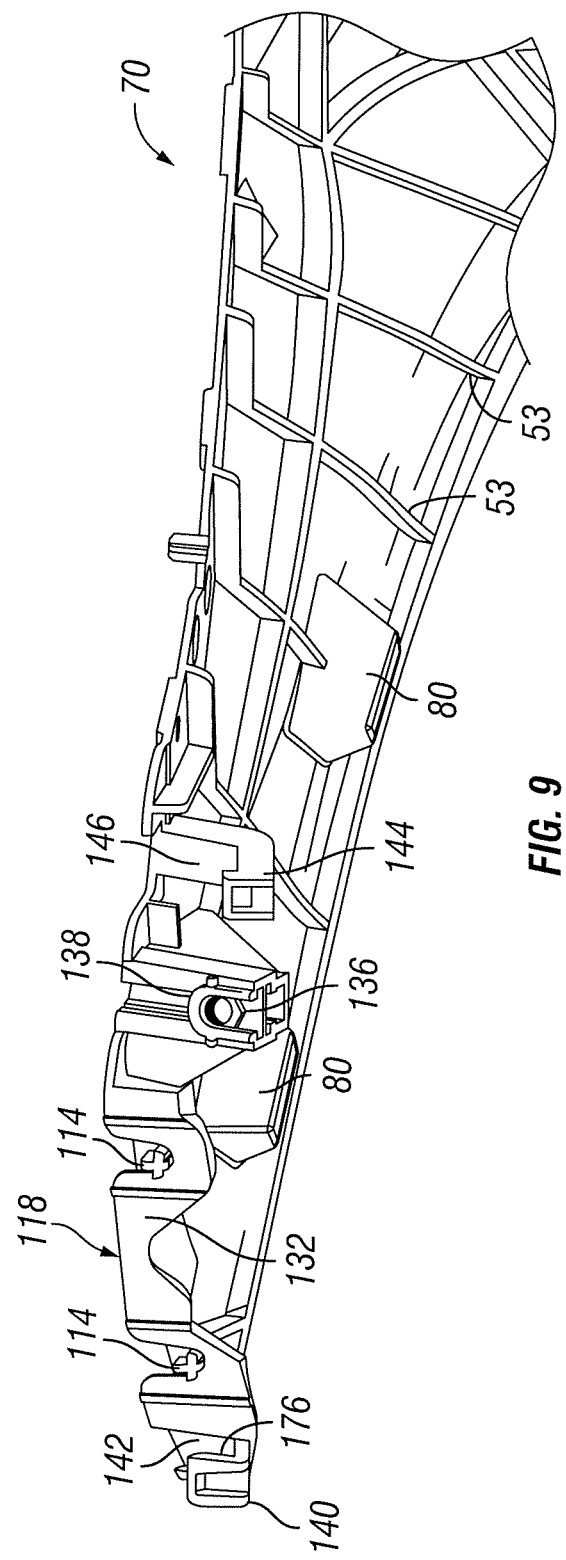
FIG. 9 is a detailed view of a portion of the fascia support bracket at the upper left side of the vehicle body structure illustrated in FIGS. 1 to 3.
Figure 10:
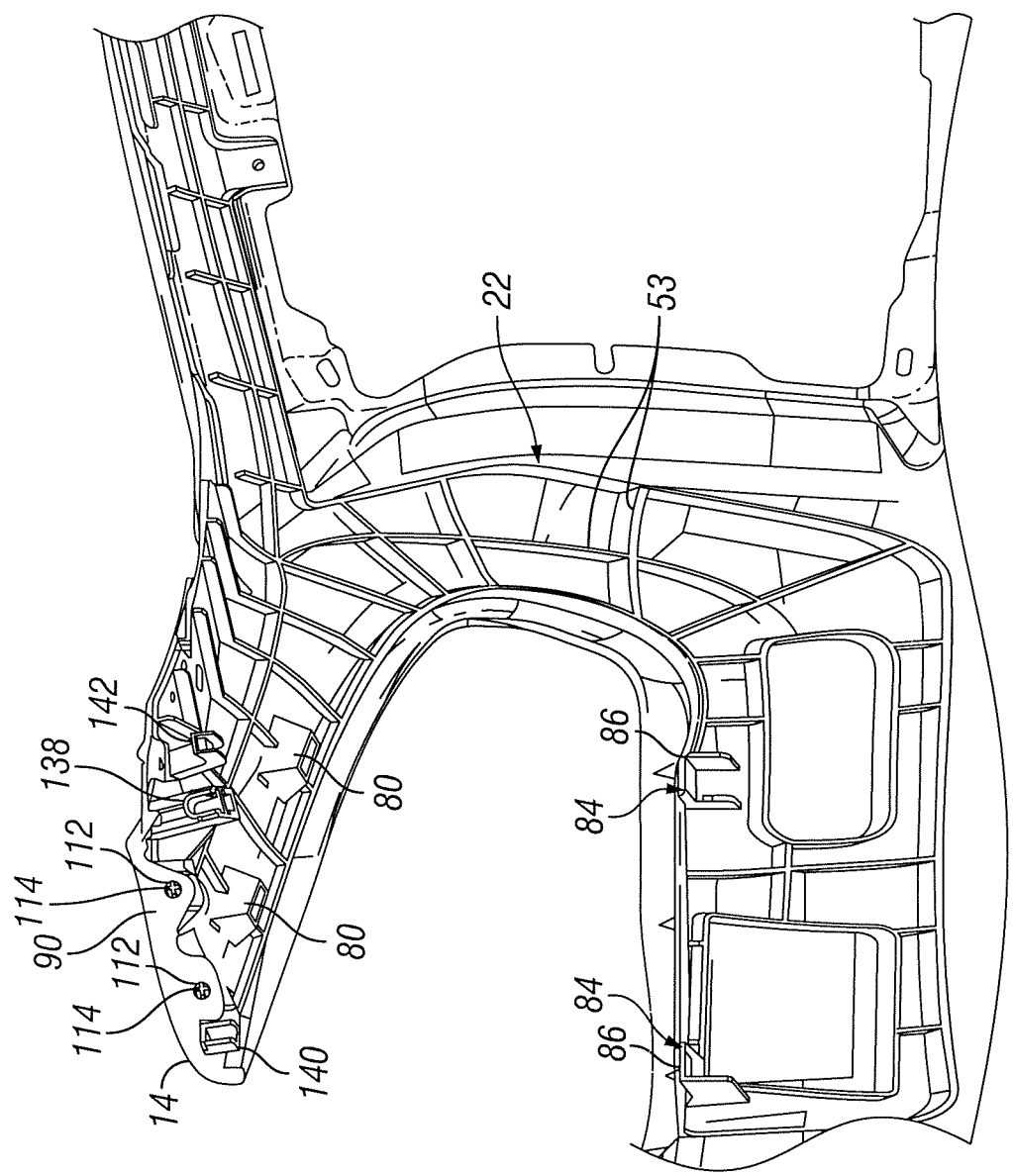
FIG. 10 is a detailed view of a portion of the fascia support bracket at the left side of the vehicle body structure illustrated in FIGS. 1 to 3.
Figure 11:
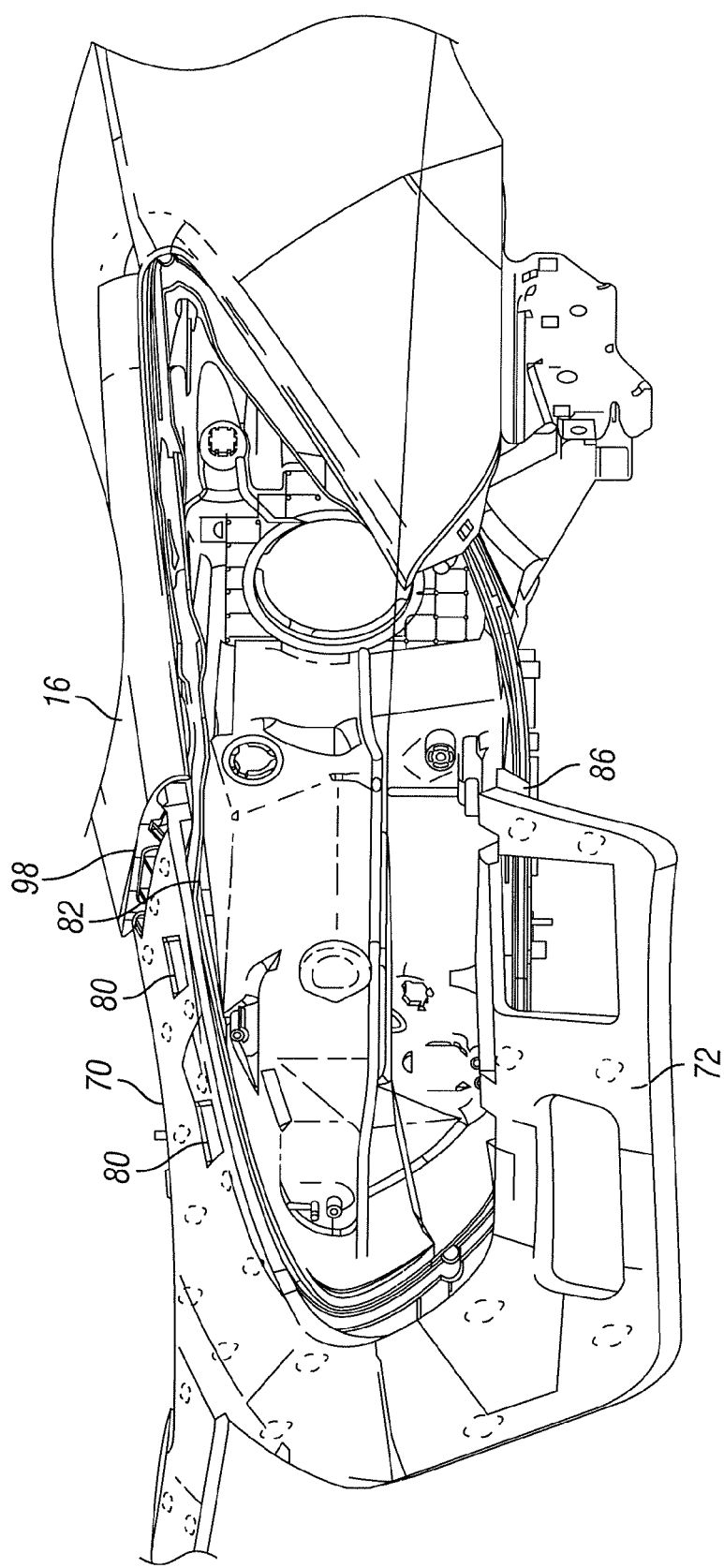
FIG. 11 is a detailed front perspective view of the lamp area at the front left side of the vehicle body structure illustrated in FIGS. 1 to 3.

Accordingly, as can be appreciated from FIG. 8, for example, when the fastening element couples the first and second fastening members 118 and 120 together (i.e., the bolt 122 is being threaded into the nut 136), the outboard end 154 (first end) of the second fastening member 120 is forced against the first support 140 of the first fastening member 118 and away from the fender mounting flange 94. The pivot projection 170 therefore creates a lever or fulcrum action of the second fastening member 120. An inner surface 176 of the first support 140 limits movement of the outboard end 154 (first end) of the second fastening member 120 away from the fender mounting flange 94. Accordingly, the surface 176 acts as a reactive surface while the bolt 122 is being driven so that the pivoting action about the pivot projection 170 pushes the fender mounting flange 94 and bumper fascia mounting flange 90 together.

To summarize, when assembling one of the fender body panels 16 to the bumper fascia panel 14, the fascia support bracket 22 can be first secured to the bumper fascia panel 14 by rivets, screws, or any other suitable fastener. Then, the fender body panel 16 is aligned with the bumper fascia panel 14 by inserting the locating projections 114, which have already been inserted though the mounting holes 112 in the bumper fascia mounting flange 90, into the mounting holes 116 in the fender mounting flange 94. Next, the fender attachment bracket 120 (second fastening member 120) is placed in the first and second supports 140 and 144 as discussed above. As noted above, the channel 164 enables the second fastening member 120 to be more readily maneuvered about the locating pins 114 without interference from the locating pins 114, so that the locating pins 114 can be received in the locating pin receiving openings 166 and 168 in the second fastening member 120. The installer can then drive the bolt 122 as discussed above to sandwich the bumper fascia mounting flange 90 and the fender mounting flange 94 together between the first and second fastening members 118 and 120. The bolt 122 can be present in the fastener bore 162 before the installer places the second fastening member 120 in the first and second supports 140 and 144. Alternatively, the installer can insert the bolt 122 into the fastener bore 162 after placing the second fastening member 120 in the first and second supports 140 and 144. Thus, a single threaded fastener (bolt 122) can be used to secure the bumper fascia panel 14 to the fender body panel 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a bumper fascia panel including an outboard surface, an inboard surface, a front end fascia section and a side fascia section, the side fascia section including
        an upper fascia portion;
        a lower fascia portion; and
        a first peripheral edge extending continuously along the upper fascia portion and the lower fascia portion and defining a a first headlamp cutout such that the upper fascia portion is positioned above the first headlamp cutout and the lower fascia portion is positioned below the first headlamp cutout opposite to the upper fascia portion; and
    a fascia support bracket contacting the inboard surface of the bumper fascia panel to support the front end fascia section and the side fascia section, the fascia support bracket including
        a front end fascia support section extending along the front end fascia section; and
        a side fascia support section including
            an upper support portion extending along the upper fascia portion;
            a lower support portion extending along the lower fascia portion; and
            a second peripheral edge extending continuously along the upper support portion and the lower support portion and defining a second headlamp cutout with the upper support portion positioned above the second headlamp cutout and the lower support portion positioned below the second headlamp cutout opposite the upper support portion, the second peripheral edge being positioned adjacent to the first peripheral edge such that the second headlamp cutout is concentric with the first headlamp cutout.

2. The vehicle body structure according to claim 1, further comprising
    a headlamp extending through the first and second headlamp cutouts, wherein the upper support portion includes at least one standoff projection extending from the upper support portion and contacting the headlamp such that the upper fascia portion is supported by the headlamp via the standoff projection.

3. The vehicle body structure according to claim 1, further comprising
    a headlamp extending through the first and second headlamp cutouts, wherein the lower support portion includes an attachment structure coupled to the headlamp and located adjacent to the second peripheral edge such that the lower fascia portion is supported by the headlamp via the attachment structure.

4. The vehicle body structure according to claim 1, further comprising
    a front end module and a bumper fascia retainer attached to the front end module, with the front end fascia support section and the front end fascia section attached to the bumper fascia retainer, wherein the front end fascia support section is positioned between the bumper fascia retainer and the front end fascia section.

5. The vehicle body structure according to claim 1, wherein the upper fascia portion has a distal end opposite the front end fascia portion, the distal end including a fascia mounting flange extending from the outboard surface of the bumper fascia panel at an angle to form an outboard abutment edge between the outboard surface and the fascia mounting flange such that the outboard abutment edge is visible from an exterior view of the vehicle body structure.

6. The vehicle body structure according to claim 5, wherein the upper support portion includes a support mounting structure positioned adjacent to the fascia mounting flange.

7. The vehicle body structure according to claim 1, wherein the side fascia section of the bumper fascia panel and the side fascia support section of the fascia support bracket have corresponding shapes, and the side fascia support section is nested within the side fascia section.

8. The vehicle body structure according to claim 1, wherein the fascia support bracket has an outboard side and an inboard side, and the outboard side includes a plurality of contact projections extending towards the inboard surface of the bumper fascia panel, the contact projections having contact surfaces that contact the inboard surface of the bumper fascia panel.

9. The vehicle body structure according to claim 1, wherein the front end fascia support section is integrally formed with the side fascia support section as a one-piece member such that the front end fascia support section, the upper support portion, and the lower support portion each have a base and a distal end, with the bases of the front end fascia support section, the upper support portion, and the lower support portion integrally joined at an apex of the second headlamp cutout, wherein the distal end of the upper support portion is located above the second headlamp cutout, and the distal end of the lower support portion is located below the second headlamp cutout opposite the distal end of the upper support portion.

10. The vehicle body structure according to claim 6, further comprising
a fender panel, and a fender mounting bracket attached to the support mounting structure of the upper support portion and coupling the bumper fascia panel to the fender panel to form a seam between the bumper fascia panel and the fender panel.

11. A fascia support bracket for supporting a bumper fascia panel comprising:
a front end fascia support section; and
a side fascia support including
an upper support portion;
a lower support portion; and
a peripheral edge extending continuously along the upper support portion and the lower support portion and defining a headlamp cutout with the upper support portion positioned above the headlamp cutout and the lower support portion positioned below the headlamp cutout opposite the upper support portion;
the front end fascia support section being integrally formed with the side fascia support section as a one-piece member such that the front end fascia support section, the upper support portion, and the lower support portion each have a base and a distal end, with the bases of the front end fascia support section, the upper support portion, and the lower support portion integrally joined at an apex of the headlamp cutout, the distal end of the upper support portion being located above the headlamp cutout, and the distal end of the lower support portion being located below the headlamp cutout opposite the distal end of the upper support portion.

12. The fascia support bracket according to claim 11, wherein
the upper support portion includes at least one standoff projection extending from the upper support portion.

13. The fascia support bracket according to claim 11, wherein
the distal end of the upper support portion includes a support mounting structure.

14. The fascia support bracket according to claim 13, wherein
the support mounting structure includes a first support structure at an outboard side of the support mounting structure and a second support structure at an inboard side of the support mounting structure.

15. The fascia support bracket according to claim 14, wherein
the support mounting structure includes locating projections located between the first support structure and the second support structure.

16. The fascia support bracket according to claim 11, wherein
the fascia support bracket has an outboard side and an inboard side, and the outboard side includes a plurality of contact projections having contact surfaces.

17. A vehicle body structure comprising:
a bumper fascia panel having an outboard surface, an inboard surface, a front end fascia section and a side fascia section, the side fascia section including
an upper fascia portion;
a lower fascia portion; and
a first peripheral edge extending continuously along the upper fascia portion and the lower fascia portion and defining a first headlamp cutout such that a distal end of the upper fascia portion is positioned above the first headlamp cutout and a distal end of the lower fascia portion is positioned below the first headlamp cutout opposite the distal end of the upper fascia portion;
a fender panel including
an upper fender portion having a distal end positioned adjacent the distal end of the upper fascia portion;
a lower fender portion having a distal end positioned adjacent the distal end of the lower fascia portion; and
a second peripheral edge extending continuously along the upper fender portion and the lower fender portion and defining a second headlamp cutout such that the distal end of the upper fender portion is positioned above the second headlamp cutout and the distal end of the lower fender portion is positioned below the second headlamp cutout opposite the distal end of the upper fender portion, the first headlamp cutout and the second headlamp cutout being aligned to form a headlamp receiving aperture circumscribed by the first peripheral edge and the second peripheral edge; and
a fascia support bracket contacting the inboard surface of the bumper fascia panel to support the front end fascia section and side fascia section, the fascia support bracket including
a front end fascia support section extending along the front end fascia section; and
a side fascia support section nested within the side fascia section, the side fascia support section including
an upper support portion extending along the upper fascia portion;

a lower support portion extending along the lower fascia portion; and a third peripheral edge extending continuously along the upper support portion and the lower support portion and defining a third headlamp cutout such that a distal end of the upper support portion is positioned above the third headlamp cutout and a distal end of the lower support portion is positioned below the third headlamp cutout opposite the distal end of the upper support portion, and the third peripheral edge being positioned adjacent to the first peripheral edge such that the third headlamp cutout is concentric with the first headlamp cutout.

18. The vehicle body structure according to claim 17, wherein the distal end of the upper fascia portion includes a fascia mounting flange extending from the outboard surface of the bumper fascia panel at an angle to form a first outboard abutment edge that is visible from an exterior view of the vehicle body structure, and the distal end of the upper fender portion includes a fender mounting flange extending from an outboard surface of the fender panel at an angle to form a second outboard abutment edge that is visible from an exterior view of the vehicle body structure, with the distal end of the upper fascia portion coupled to the distal end of the upper fender portion such that the first abutment edge and the second abutment edge define a seam between the bumper fascia panel and the fender panel.

19. The vehicle body structure according to claim 18, wherein the distal end of the upper support portion includes a support mounting structure located adjacent to the fascia mounting flange.

20. The vehicle body structure according to claim 19, further comprising a fender mounting member attached to the support mounting structure to couple the distal end of the upper fascia portion to the distal end of the upper fender portion, the support mounting structure including a first support structure at an outboard side of the support mounting structure and a second support structure at an inboard side of the support mounting structure configured and arranged to support the fender mounting member, and a fastener receiving structure located between the first support structure and the second support structure.

* * * * *